(12) United States Patent
Chen et al.

(10) Patent No.: US 12,549,295 B2
(45) Date of Patent: Feb. 10, 2026

(54) HYBRID AUTOMATIC REPEAT REQUEST (HARQ) BUFFER MANAGEMENT

(71) Applicant: QUALCOMM Incorporated, San Diego, CA (US)

(72) Inventors: Xing Chen, San Diego, CA (US); Shailesh Maheshwari, San Diego, CA (US); Nate Chizgi, Sunnyvale, CA (US); Omar Mehanna, San Diego, CA (US); Carlos Jesus Romanillos, Santee, CA (US); Sivaram Srivenkata Palakodety, San Diego, CA (US); Kai Tu, La Jolla, CA (US); Hobin Kim, San Diego, CA (US); Akshay Kumar, San Diego, CA (US); Arnaud Meylan, San Diego, CA (US); Arun Prasanth Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 611 days.

(21) Appl. No.: 17/649,663

(22) Filed: Feb. 1, 2022

(65) Prior Publication Data

US 2023/0246749 A1 Aug. 3, 2023

(51) Int. Cl.
*H04L 1/1867* (2023.01)
*H04L 1/1812* (2023.01)

(52) U.S. Cl.
CPC .......... *H04L 1/1874* (2013.01); *H04L 1/1812* (2013.01)

(58) Field of Classification Search
CPC ...................................................... H04L 1/1874
See application file for complete search history.

(56) References Cited

U.S. PATENT DOCUMENTS

2009/0249150 A1\* 10/2009 Grovlen ................ H04L 1/1835
714/748
2011/0103326 A1\* 5/2011 Kim ...................... H04L 1/1812
370/329

(Continued)

FOREIGN PATENT DOCUMENTS

EP 2086152 A2 \* 8/2009 ........... H04L 1/1812

OTHER PUBLICATIONS

Huawei et al., "Discussion on HARQ Configuration in NR", 3GPP TSG-RAN WG2 Meeting #99bis, R2-1711432, 3rd Generation Partnership Project, Mobile Competence Centre, 650, Route Des Lucioles, F-06921 Sophia-Antipolis Cedex, France, vol. RAN WG2, No. Prague, Czech Republic, Oct. 9, 2017-Oct. 13, 2017, Oct. 8, 2017, XP051343417, 3 Pages, Retrieved on Oct. 8, 2017, p. 3.

(Continued)

*Primary Examiner* — Joseph E Avellino
*Assistant Examiner* — Maryam Emadi
(74) *Attorney, Agent, or Firm* — Harrity & Harrity LLP

(57) ABSTRACT

Various aspects of the present disclosure generally relate to wireless communication. In some aspects, a wireless communication device may identify, for removal from a hybrid automatic repeat request (HARQ) buffer of the wireless communication device, a HARQ process from a plurality of HARQ processes maintained in the HARQ buffer by the wireless communication device, wherein the HARQ process is identified based at least in part on one or more HARQ buffer management parameters. The wireless communication device may remove the HARQ process from the HARQ buffer. Numerous other aspects are described.

30 Claims, 14 Drawing Sheets

(56) References Cited

U.S. PATENT DOCUMENTS

| | | | |
|---|---|---|---|
| 2015/0172023 A1* | 6/2015 | Yang | H04L 1/1822 370/329 |
| 2017/0338912 A1* | 11/2017 | Nigam | H04L 1/1819 |
| 2021/0067279 A1 | 3/2021 | Sarkis et al. | |
| 2021/0168836 A1* | 6/2021 | Takeda | H04W 72/1263 |
| 2022/0014315 A1* | 1/2022 | Kong | H04W 72/23 |

OTHER PUBLICATIONS

International Search Report and Written Opinion—PCT/US2022/082617—ISA/EPO—Mar. 15, 2023.
Kim S., et al., "Performance Analysis of Hybrid ARQ Buffer Management", 2018 International Conference on Computing, Networking and Communications (ICNC), IEEE, Mar. 5, 2018, pp. 503-507, XP033361107, 5 Pages, Retrieved on Jun. 19, 2018, p. 3-p. 4.

* cited by examiner

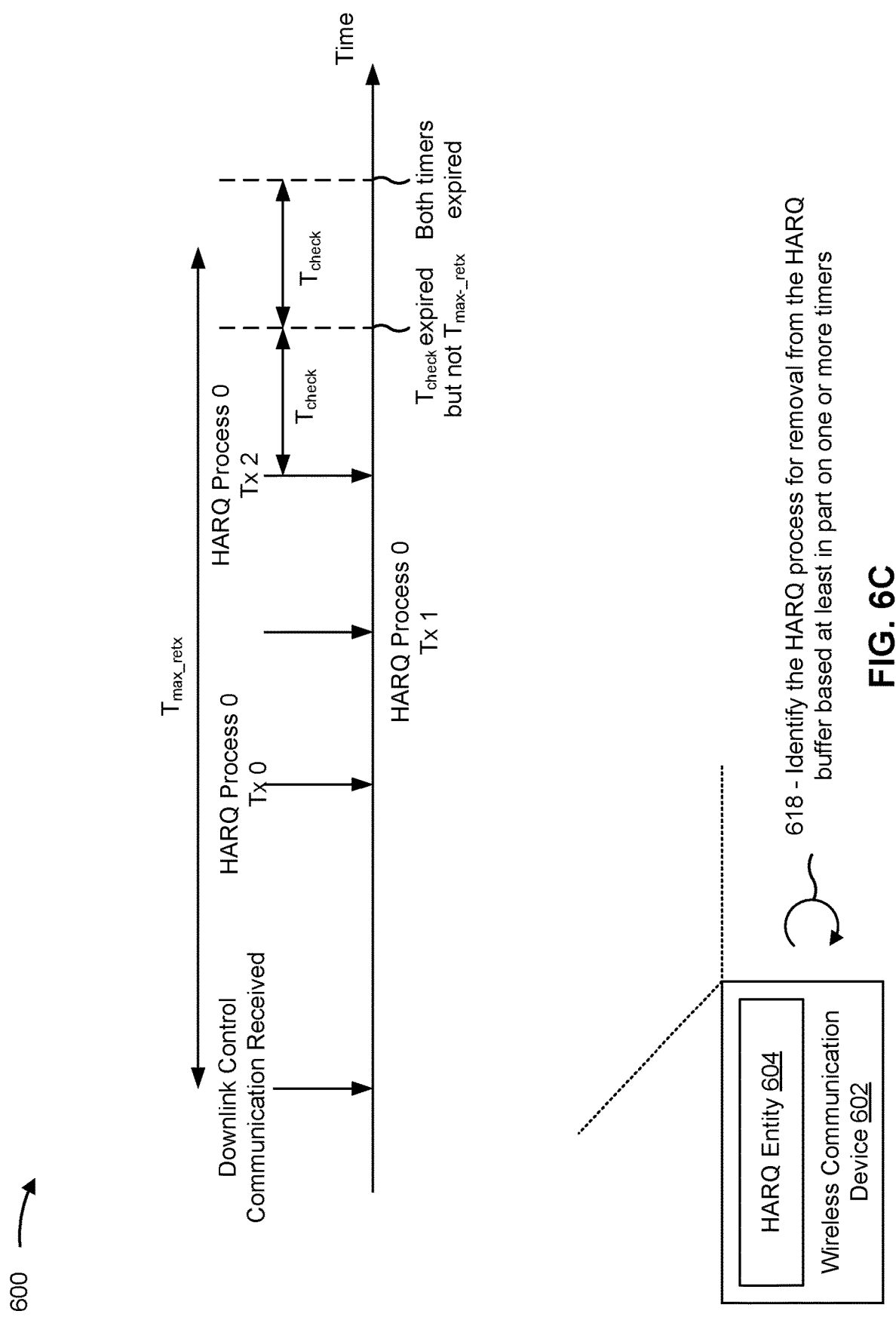

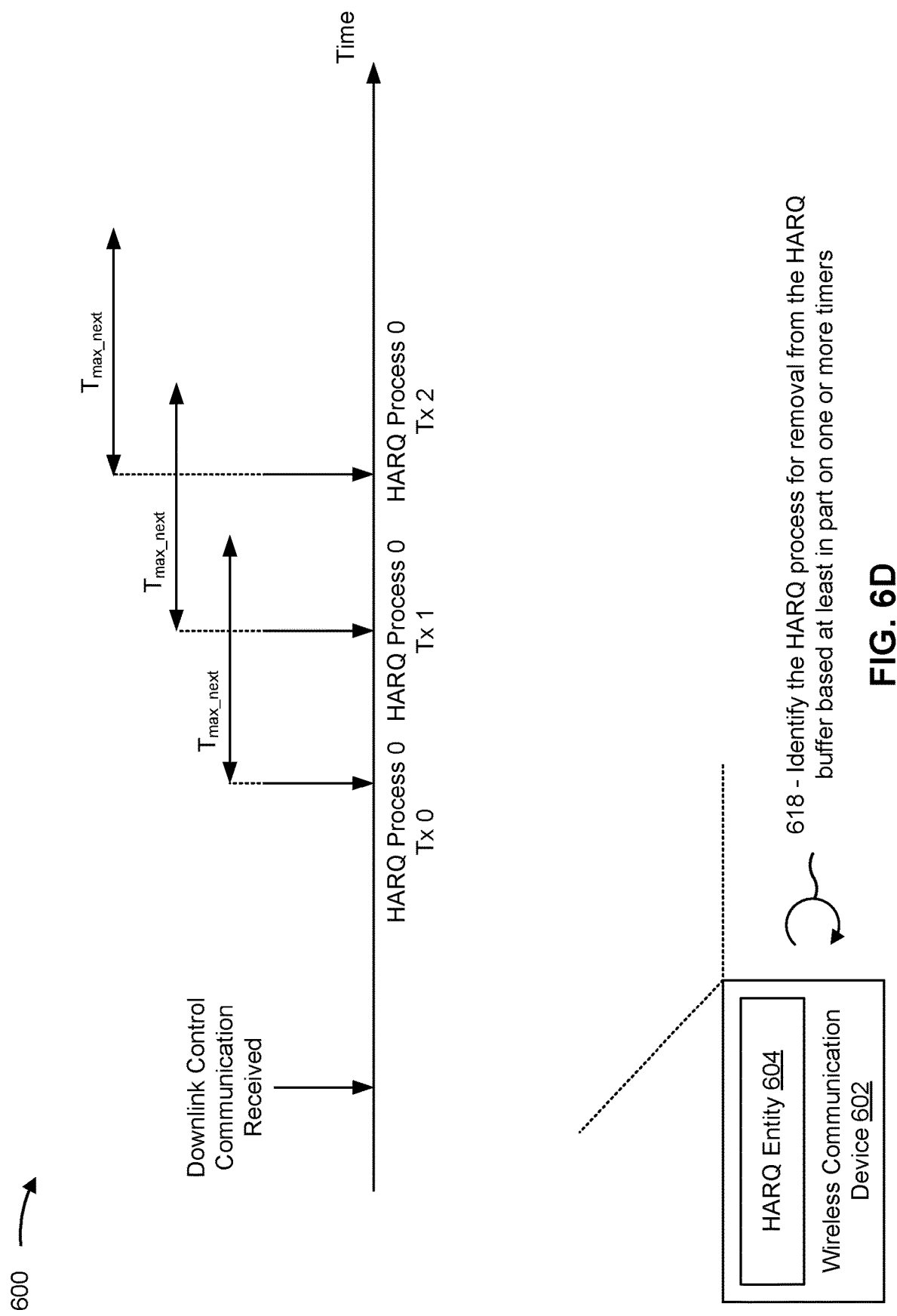

HYBRID AUTOMATIC REPEAT REQUEST (HARQ) BUFFER MANAGEMENT

FIELD OF THE DISCLOSURE

Aspects of the present disclosure generally relate to wireless communication and to techniques and apparatuses for hybrid automatic repeat request (HARQ) buffer management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A-6E are diagrams illustrating examples associated with HARQ buffer management, in accordance with the present disclosure.

SUMMARY

Figure 1:
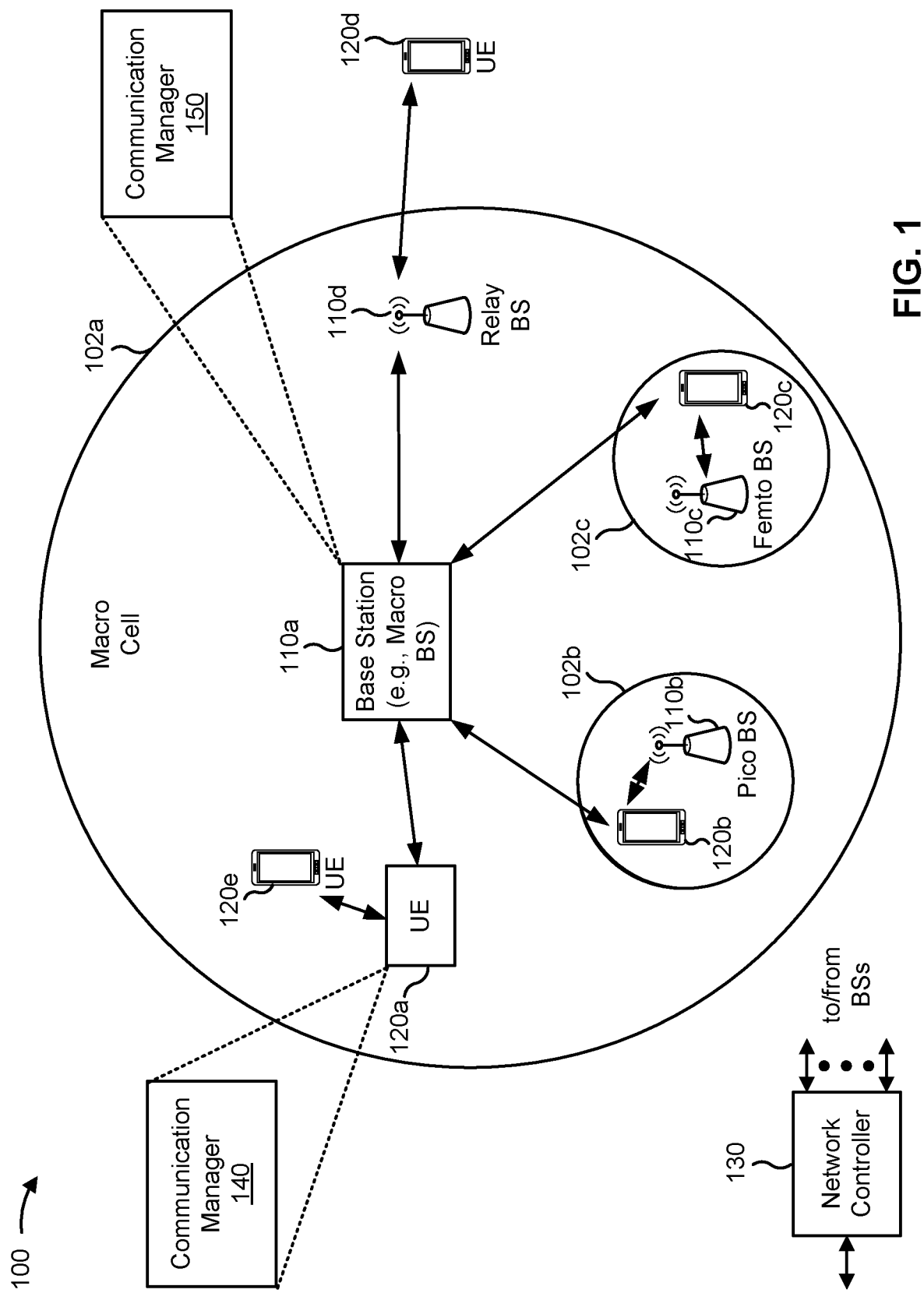
FIG. 1 is a diagram illustrating an example of a wireless network, in accordance with the present disclosure.

Some aspects described herein relate to a method of wireless communication performed by a wireless communication device. The method may include identifying, for removal from a hybrid automatic repeat request (HARQ) buffer of the wireless communication device, a HARQ process from a plurality of HARQ processes maintained in the HARQ buffer by the wireless communication device, where the HARQ process is identified based at least in part on one or more HARQ buffer management parameters. The method may include removing the HARQ process from the HARQ buffer.

Some aspects described herein relate to a wireless communication device for wireless communication. The wireless communication device may include a memory and one or more processors coupled to the memory. The one or more processors may be configured to identify, for removal from a HARQ buffer of the wireless communication device, a HARQ process from a plurality of HARQ processes maintained in the HARQ buffer by the wireless communication device. The one or more processors may be configured to remove the HARQ process from the HARQ buffer.

Some aspects described herein relate to a non-transitory computer-readable medium that stores a set of instructions for wireless communication by a wireless communication device. The set of instructions, when executed by one or more processors of the wireless communication device, may cause the wireless communication device to identify, for removal from a HARQ buffer of the wireless communication device, a HARQ process from a plurality of HARQ processes maintained in the HARQ buffer by the wireless communication device. The set of instructions, when executed by one or more processors of the wireless communication device, may cause the wireless communication device to remove the HARQ process from the HARQ buffer.

Some aspects described herein relate to an apparatus for wireless communication. The apparatus may include means for identifying, for removal from a HARQ buffer of the apparatus, a HARQ process from a plurality of HARQ processes maintained in the HARQ buffer by the apparatus, where the HARQ process is identified based at least in part on one or more HARQ buffer management parameters. The apparatus may include means for removing the HARQ process from the HARQ buffer.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims. While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the wireless communication device may include a communication manager 140, a communication manager 150, and/or another communication manager. As described in more detail elsewhere herein, the communication manager 140 and/or the communication manager 150 may identify, for removal from a hybrid automatic repeat request (HARQ) buffer of the wireless communication device, a HARQ process from a plurality of HARQ processes maintained in the HARQ buffer by the wireless communication device, wherein the HARQ process is identified based at least in part on one or more HARQ buffer management parameters; and remove the HARQ process from the HARQ buffer. Additionally, or alternatively, the communication manager 140 and/or the communication manager 150 may perform one or more other operations described herein.

As indicated above, FIG. 1 is provided as an example. Other examples may differ from what is described with regard to FIG. 1.

Figure 2:
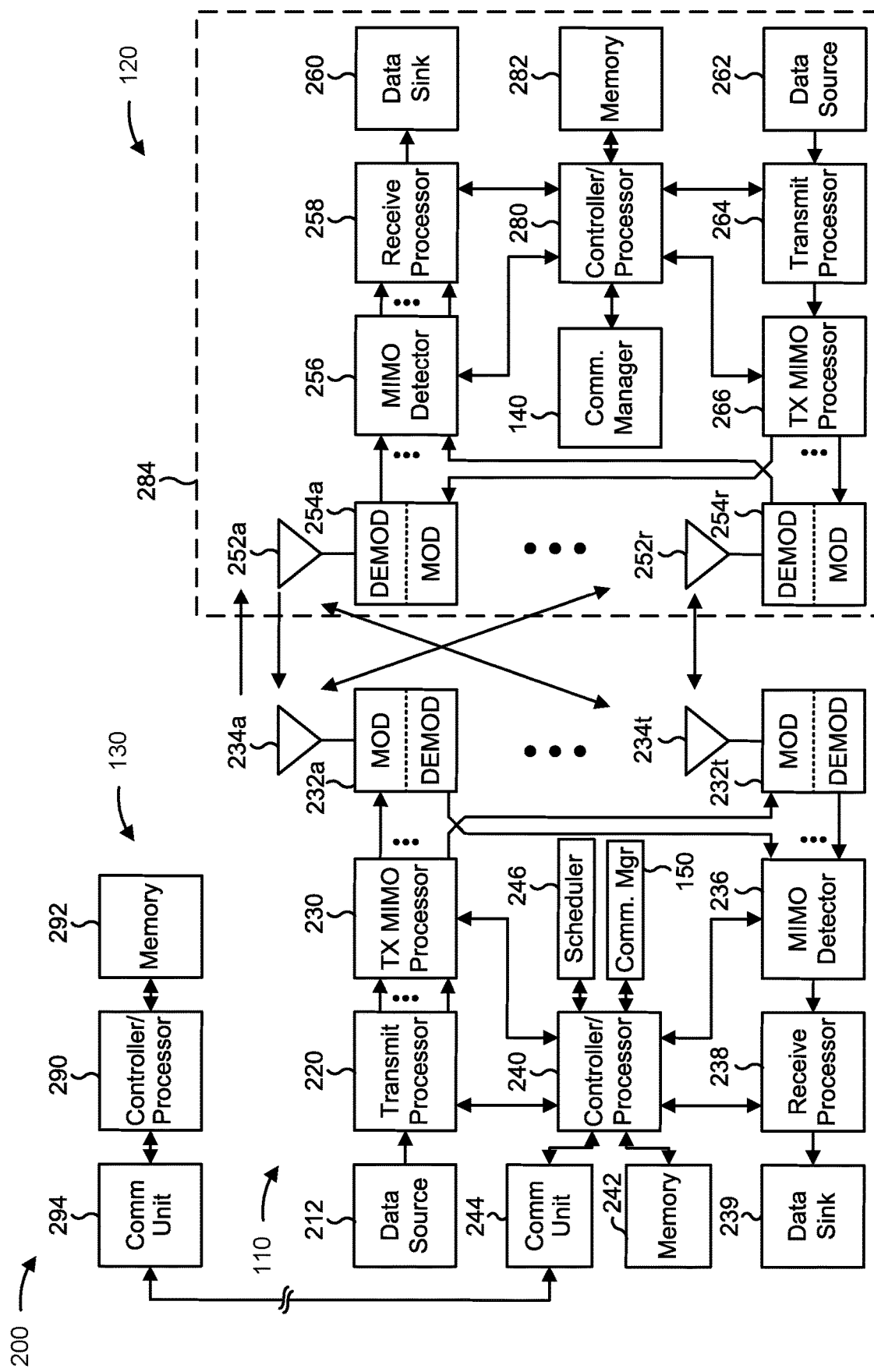
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-10).

The controller/processor 240 of the base station 110, the controller/processor 280 of the UE 120, and/or any other component(s) of FIG. 2 may perform one or more techniques associated with HARQ buffer management, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the wireless communication device (e.g., a base station 110, a UE 120) includes means for identifying, for removal from a HARQ buffer of the wireless communication device, a HARQ process from a plurality of HARQ processes maintained in the HARQ buffer by the wireless communication device, wherein the HARQ process is identified based at least in part on one or more HARQ buffer management parameters; and/or means for removing the HARQ process from the HARQ buffer. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
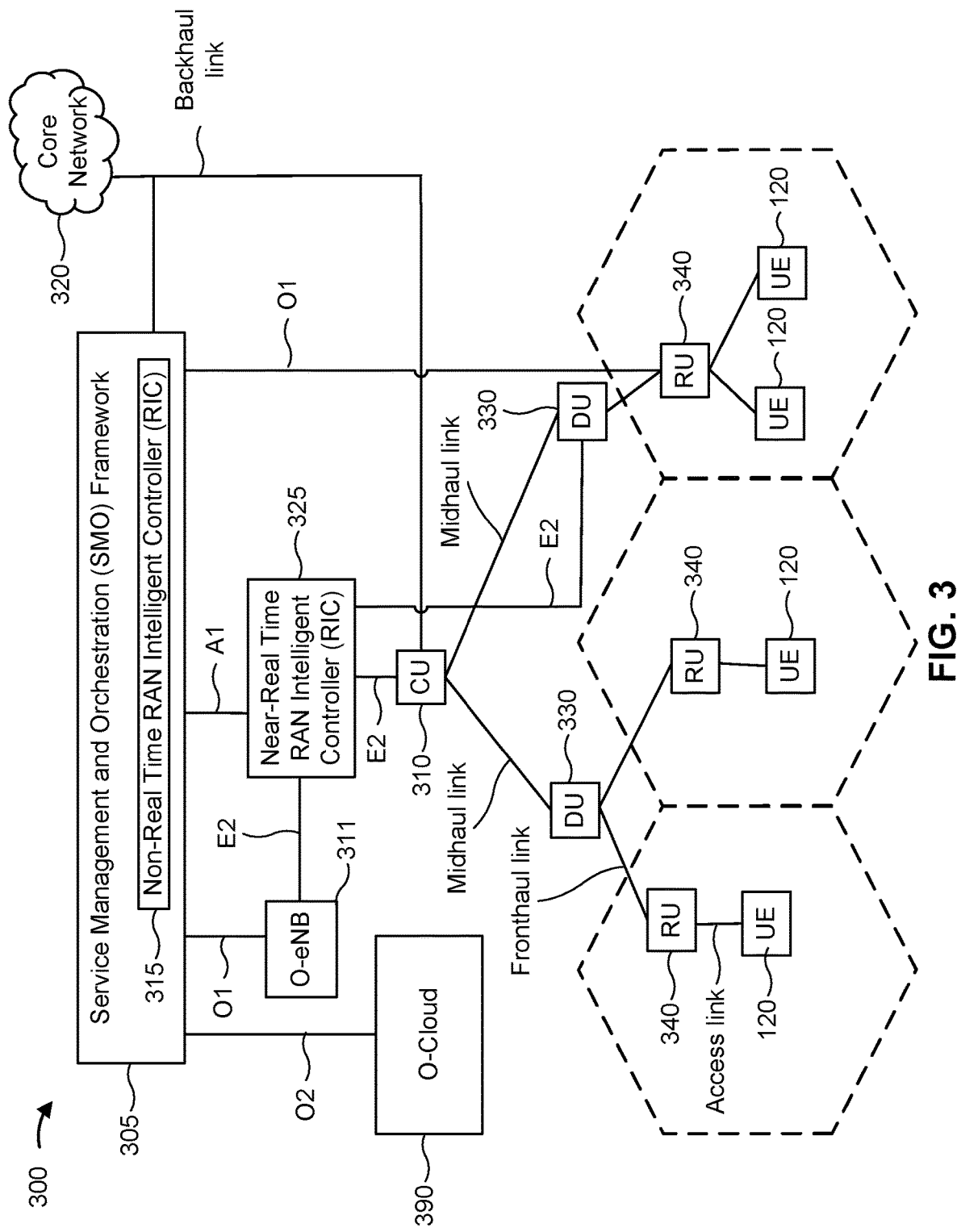
FIG. 3 is a diagram illustrating an example 300 of an open radio access network (O-RAN) architecture, in accordance with the present disclosure.

FIG. 3 is a diagram illustrating an example of a disaggregated base station architecture 300. The disaggregated base station architecture 300 may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (i.e., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter, or a transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
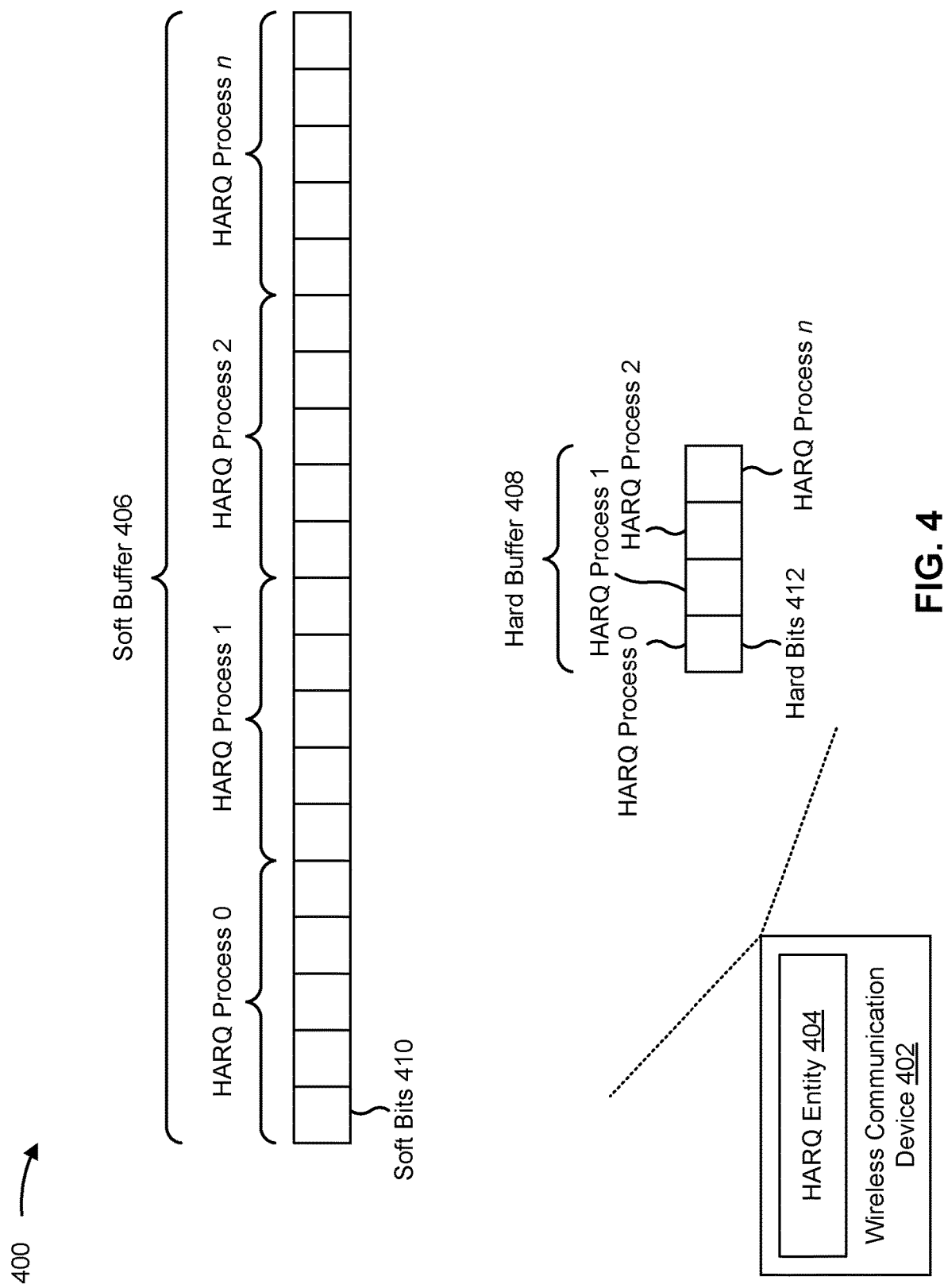
FIG. 4 is a diagram of an example of hybrid automatic repeat request (HARQ) buffers for a wireless communication device.

FIG. 4 is a diagram of an example 400 of HARQ buffers for a wireless communication device 402 (e.g., a base station 110, a UE 120, a DU 330, an RU 340). HARQ is a procedure that is used at the medium access control (MAC) layer between wireless communication devices in a wireless network. HARQ may be used to manage retransmissions and recovery of over the air (OTA) data in the wireless network.

As shown in FIG. 4, the wireless communication device 402 may include a HARQ entity 404. The HARQ entity 404 is a component that maintains one or more HARQ processes for the wireless communication device 402. In some aspects, the HARQ entity 404 includes or is included in one or more of communication manager 150, transmit processor 220, TX MIMO processor 230, modem 232, antenna 234, MIMO detector 236, receive processor 238, controller/processor 240, memory 242, or scheduler 246 of FIG. 2. In some aspects, the HARQ entity 404 includes or is included in one or more of communication manager 140, antenna 252, modem 254, MIMO detector 256, receive processor 258, transmit processor 264, TX MIMO processor 266, controller/processor 280, or memory 282.

In some aspects, the HARQ entity 404 maintains a plurality of HARQ processes for the wireless communication device 402, such as HARQ process 0 through HARQ process n. The quantity of HARQ processes illustrated in FIG. 4 is an example, and other quantities of HARQ processes are within the scope of the present disclosure Maintaining a plurality of HARQ processes in parallel enables the wireless communication device 402 to simultaneously receive a plurality of communications, which reduces latency and increases throughput for the wireless communication device 402.

A HARQ process includes a technique for tracking acknowledgement (ACK) and/or negative ACK (NACK) for a received communication. For example, a HARQ process may be used for a transmitter wireless communication device (e.g., a wireless communication device that transmits a communication) and a receiver wireless communication device (e.g., a wireless communication device that receives the communication) to track whether an ACK or a NACK has been provided for the communication. Moreover, the HARQ process for a communication may be used for tracking retransmissions, soft combining, and/or other HARQ techniques for the communication.

In some aspects, the wireless communication device 402 maintains a rotatable pool of HARQ processes. For example, the HARQ process 0 may be used for a first communication, and may be reassigned to a second communication once an ACK is received for the first communication, and so on. This increases utilization of the HARQ processes and reduces the quantity of HARQ processes needed to implement HARQ by the wireless communication device 402.

As further shown in FIG. 4, the HARQ entity 404 maintains the HARQ processes in one or more HARQ buffers. For example, each HARQ process may be assigned respective portions of a soft buffer 406 and respective portions of a hard buffer 408 maintained by the HARQ entity 404. In some aspects, each HARQ process is allocated a dedicated soft buffer 406 and/or a dedicated hard buffer 408.

The HARQ entity 404 may store soft bits 410 for one or more of the HARQ processes in the soft buffer 406. The soft bits 410 may include demodulated log-likelihood ratios (LLRs) for communications associated with the one or more HARQ processes. The HARQ entity 404 may use the demodulated LLRs for a communication to perform soft combining with one or more retransmissions of the communication if decoding of the communication is not successful or fails.

The HARQ entity 404 may store hard bits 412 for one or more of the HARQ processes in the hard buffer 408. The hard bits 412 include decision bits for communications associated with the one or more HARQ processes. The value of a decision bit for a communication may indicate whether decoding of the communication was successful. For example, a 0-value hard bit 412 for a communication may indicate that decoding of the communication was not successful or failed (e.g., may indicate that the HARQ entity 404 decided that the decoding was not successful). As another example, a 1-value hard bit 412 for a communication may indicate that decoding of the communication was successful (e.g., may indicate that the HARQ entity 404 decided that the decoding was successful). However, other schemes for indicating decoding success or failure using the hard bits 412 are within the scope of the present disclosure.

As indicated above, FIG. 4 is provided as an example. Other examples may differ from what is described with regard to FIG. 4.

Figure 5:
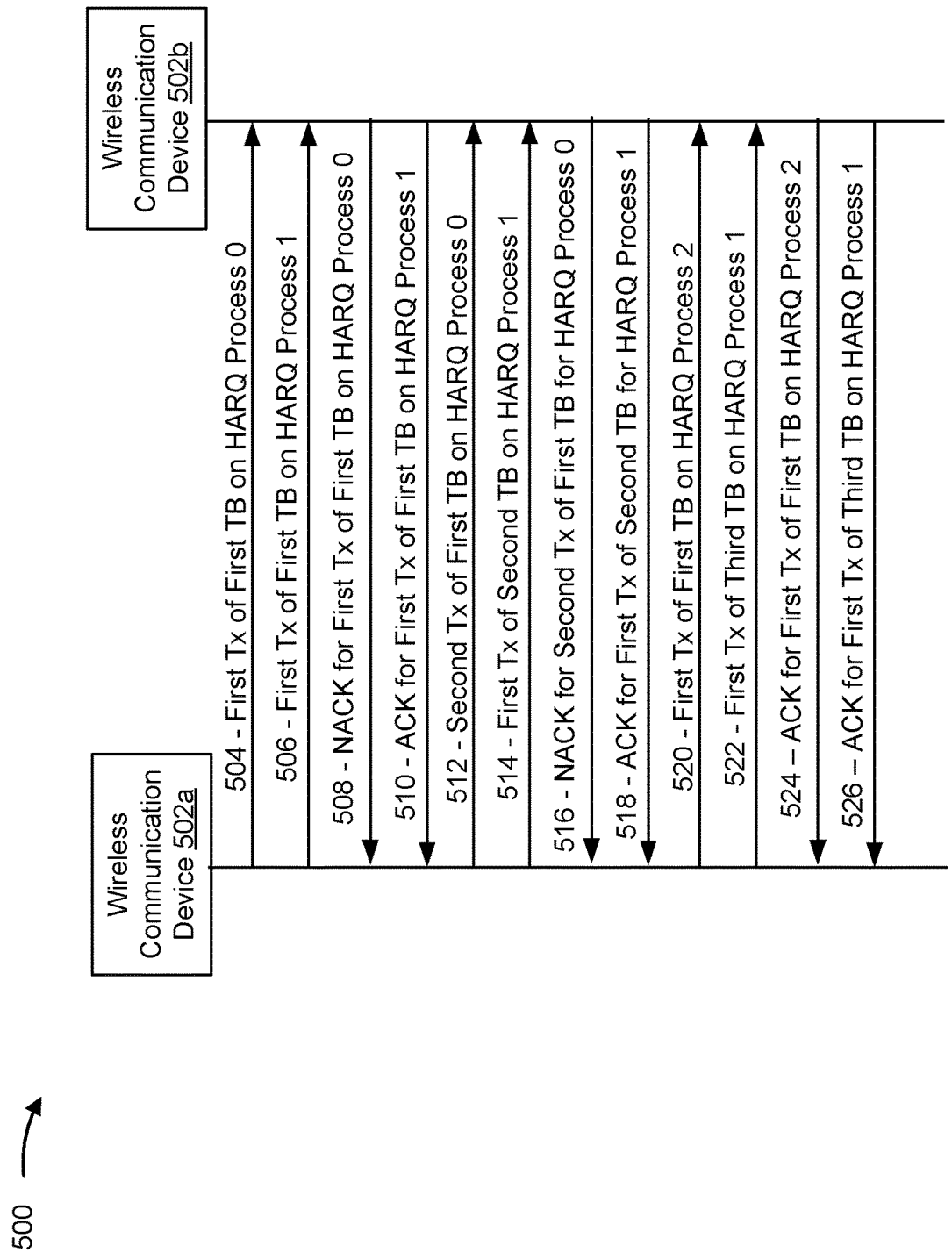
FIG. 5 is a diagram of an example of communication between wireless communication devices using HARQ.

FIG. 5 is a diagram of an example 500 of communication between wireless communication devices 502a and 502b using HARQ. In some aspects, the wireless communication devices 502a and 502b respectively include a base station 110 (or a DU 330 or RU 340) and a UE 120, or a UE 120 and a base station 110 (or a DU 330 or RU 340). In some aspects, the wireless communication devices 502a and 502b each include respective UEs 120.

In the example 500, the wireless communication device 502a is referred to as a transmitter (Tx) wireless communication device, and the wireless communication device 502b is referred to as a receiver (Rx) wireless communication device. In the example 500, wireless communication devices 502a and 502b use a plurality of HARQ processes to track ACK/NACK for the communications between the wireless communication devices 502a and 502b.

At 504, the wireless communication device 502a performs a first transmission (Tx) of a first transport block (TB) of a first communication on a HARQ process 0. At 506, the wireless communication device 502a performs a first transmission (Tx) of a first transport block (TB) of a second communication on a HARQ process 1.

At 508, the wireless communication device 502b performs a decoding attempt for the first transmission of the first transport block of the first communication and transmits a NACK to the wireless communication device 502a based at least in part on determining that the decoding attempt was not successful. At 510, the wireless communication device 502b performs a decoding attempt for the first transmission of the first transport block of the second communication and transmits an ACK to the wireless communication device 502a based at least in part on determining that the decoding attempt was successful.

At 512, the wireless communication device 502a performs a second transmission (Tx) (e.g., a retransmission) of the first transport block (TB) of the first communication on the HARQ process 0. At 514, the wireless communication device 502a performs a first transmission (Tx) of a second transport block (TB) of the second communication on the HARQ process 1.

At 516, the wireless communication device 502b performs a decoding attempt for the second transmission of the first transport block of the first communication and transmits a NACK to the wireless communication device 502a based at least in part on determining that the decoding attempt was not successful. At 518, the wireless communication device 502b performs a decoding attempt for the first transmission of the second transport block of the second communication and transmits an ACK to the wireless communication device 502a based at least in part on determining that the decoding attempt was successful.

At 520, the wireless communication device 502a performs a first transmission (Tx) of the first transport block (TB) of the first communication on a HARQ process 2. In particular, the wireless communication device 502a switches from the HARQ process 0 to the HARQ process 2 for the first communication based at least in part on the retransmission being unsuccessful, or based at least in part on a quantity of unsuccessful retransmissions for the first communication on the HARQ process 0 satisfying a threshold quantity. At 522, the wireless communication device 502a performs a first transmission (Tx) of a third transport block (TB) of the second communication on the HARQ process 1.

At 524, the wireless communication device 502b performs a decoding attempt for the first transmission of the first transport block of the first communication on the HARQ process 2 and transmits an ACK to the wireless communication device 502a based at least in part on determining that the decoding attempt was successful. At 526, the wireless communication device 502b performs a decoding attempt for the first transmission of the third transport block of the second communication and transmits an ACK to the wireless communication device 502a based at least in part on determining that the decoding attempt was successful.

As indicated above, FIG. 5 is provided as an example. Other examples may differ from what is described with regard to FIG. 5.

The HARQ buffer(s) maintained by a HARQ entity of a wireless communication device can consume a large amount of memory resources of the wireless communication device. For example, the LLRs or soft bits for the HARQ processes maintained by the HARQ entity can be larger (3-18 times larger, for example) than the systematic bits (e.g., the control and data bits) of the communications received by the wireless communication device. As the HARQ buffer(s) scale up to maintain HARQ processes for an increasing quantity of carriers, a wireless communication device may become memory constrained. In other words, a wireless communication device (e.g., a UE, an IoT device, and/or another type of wireless communication device) may not have the memory resources to maintain all HARQ processes in the HARQ buffer(s) in parallel at a given point in time.

Moreover, some HARQ processes may become stale or unused, and the wireless communication device may be unable to determine whether a HARQ process has become stale or unused (e.g., where a switch from a HARQ process to another HARQ process is not explicitly indicated). For example, in the example 500 of FIG. 5, the wireless communication device 502b may be unable to determine that the wireless communication device 502a switched from the HARQ process 0 to the HARQ process 2, and that the HARQ process 0 has become stale or unused. This can result in stale or unused HARQ processes being maintained in the HARQ buffer(s) while higher priority HARQ processes and/or more active HARQ processes are not added to the HARQ buffer(s), particularly where the wireless communication device is memory constrained. As a result, wireless communication reliability for the wireless communication may be reduced.

Some aspects described herein provide HARQ buffer management techniques that may reduce memory resource consumption of a wireless communication device for maintaining a plurality of HARQ processes. As described herein, a wireless communication device may prioritize certain HARQ processes over other HARQ processes when determining which HARQ processes are to be removed from a HARQ buffer. In this way, the wireless communication device maintains HARQ processes for the most active HARQ processes, the most reliable HARQ processes, and/or for the most important types of communications, among other examples. This may increase wireless communication reliability for the wireless communication device.

Moreover, and as described herein, a wireless communication device may proactively identify stale and/or unused HARQ processes for removal from a HARQ buffer. A stale or unused HARQ process may refer to a HARQ process that is no longer used by a transmitter wireless communication device and/or is abandoned by a transmitter wireless communication device. This may reduce memory resource consumption for the wireless communication device and may provide more space in the HARQ buffer for additional HARQ processes (which may further increase wireless communication reliability for the wireless communication device).

Additionally, and as described herein, a wireless communication device may maintain a single HARQ buffer (e.g., a shared HARQ buffer) in which the wireless communication device selectively stores either soft bit(s) or hard bit(s) for a HARQ process. In this way, the wireless communication device consumes less memory resources than would otherwise be consumed on maintaining a plurality of separate HARQ buffers.

FIGS. 6A-6E are diagrams of examples 600 of HARQ buffer management, in accordance with the present disclosure. As shown in FIG. 6, the examples 600 may include a wireless communication device 602. The wireless communication device 602 (e.g., a base station 110, a UE 120, a DU 330, an RU 340) may include a HARQ entity 604 that maintains a HARQ buffer 606. The HARQ entity 604 is a component that maintains one or more HARQ processes for the wireless communication device 602. In some aspects, the HARQ entity 604 includes or is included in one or more of communication manager 150, transmit processor 220, TX MIMO processor 230, modem 232, antenna 234, MIMO detector 236, receive processor 238, controller/processor 240, memory 242, or scheduler 246 of FIG. 2. In some aspects, the HARQ entity 604 includes or is included in one or more of communication manager 140, antenna 252, modem 254, MIMO detector 256, receive processor 258, transmit processor 264, TX MIMO processor 266, controller/processor 280, or memory 282.

In some aspects, the HARQ entity 604 maintains a plurality of HARQ processes for the wireless communication device 602, such as HARQ process 0 through HARQ process m. The quantity of HARQ processes illustrated in FIGS. 6A-6E is an example, and other quantities of HARQ processes are within the scope of the present disclosure Maintaining a plurality of HARQ processes in parallel enables the wireless communication device 602 to simultaneously receive a plurality of communications, which reduces latency and increases throughput for the wireless communication device 602.

Figure 6A:
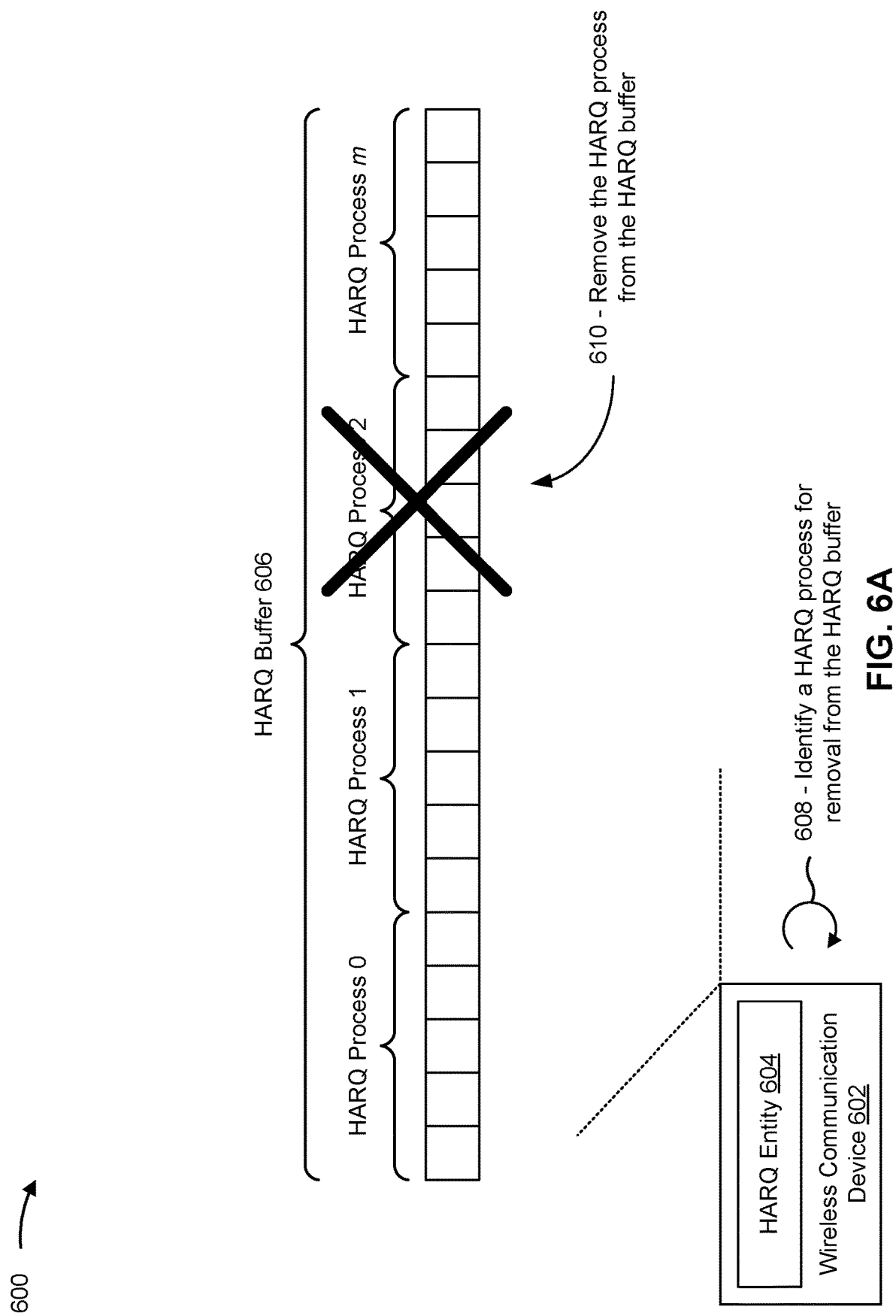

As shown in FIG. 6A, at 608, the wireless communication device 602 may identify a HARQ process, from the plurality of HARQ processes 0-m maintained in the HARQ buffer 606, for removal from the HARQ buffer 606. The wireless communication device 602 may proactively identify the HARQ process (e.g., to identify stale or unused HARQ processes), based at least in part on an event (e.g., determining to add another HARQ process to the HARQ buffer 606 and being memory constrained), and/or based at least in part on one or more other HARQ buffer management parameters. At 610, the wireless communication device 602 may remove the HARQ process (e.g., the HARQ Process 2) from the HARQ buffer 606 based at least in part on identifying the HARQ process.

Removing a HARQ process from the HARQ buffer 606, as described herein, may include removing the soft bits (e.g., soft bits 410) and/or the hard bits (e.g., hard bits 412), associated with the HARQ process, from the HARQ buffer 606. Moreover, removing a HARQ process from the HARQ buffer 606, as described herein, may include removing the identifier associated with the HARQ process from a list of HARQ processes maintained in the HARQ buffer 606 such that the bits allocated to the HARQ process in the HARQ buffer 606 can be allocated to a HARQ process that can be added to the HARQ buffer 606.

Figure 6B:
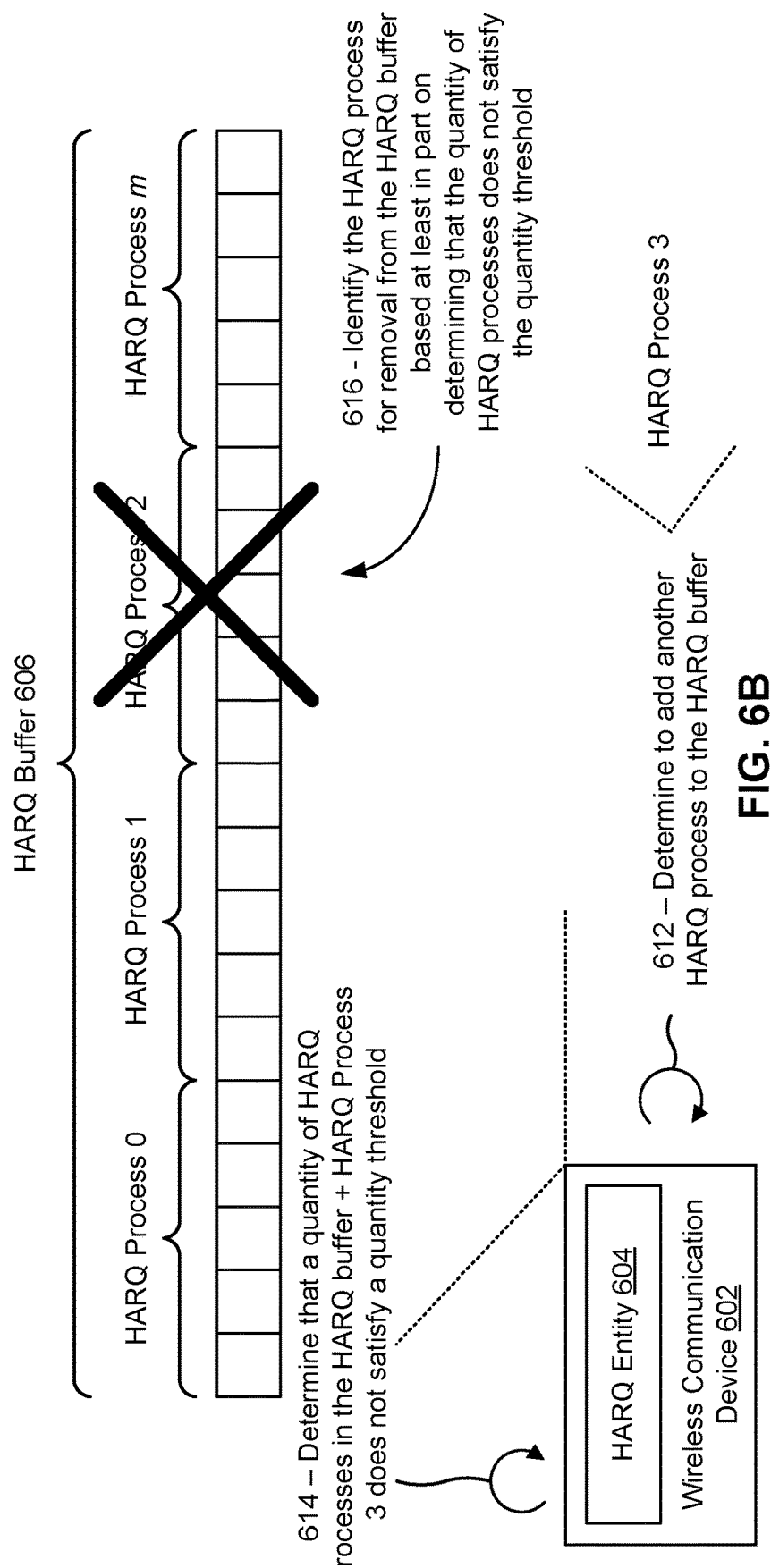

FIG. 6B illustrates an example 600 where the wireless communication device 602 identifies the HARQ process for removal from the HARQ buffer 606 based at least in part on HARQ buffer management parameters where the wireless communication device 602 is to add another HARQ process (e.g., HARQ Process 3) to the HARQ buffer 606 and is memory constrained. In other words, the wireless communication device 602 does not have sufficient memory or space in the HARQ buffer 606 for the HARQ Process 3 without first removing the HARQ process from the HARQ buffer 606.

As shown at 612, the wireless communication device 602 (and/or the HARQ entity 604) determines to add another HARQ process (e.g., the HARQ Process 3) to the HARQ buffer 606. This may include, for example, storing soft bits (e.g., soft bits 410) or hard bits (e.g., hard bits 412) in the HARQ buffer 606 for a transport block of a communication received from another wireless communication device. The wireless communication device 602 (and/or the HARQ entity 604) may determine to add the other HARQ process to the HARQ buffer 606 for a new transmission (not a retransmission) of the transport block. If the transmission of the transport block is instead a retransmission of the transport block, the wireless communication device 602 may combine the received data in the transport block with soft bits stored in the HARQ buffer 606 for an associated HARQ process that is already maintained in the HARQ buffer 606, and may attempt to decode the transport block with the combined received data and soft bits.

In some cases, for each new transmission (e.g., not a retransmission) of a transport block, the wireless communication device 602 may attempt to decode the received data in the new transmission. The wireless communication device 602 (and/or the HARQ entity 604) may determine whether a transmission of a transport block is a new transmission using various techniques. For example, the wireless communication device 602 may determine whether a new data indicator (NDI) value associated with the transmission has been enabled or configured to indicate that the transmission carries new data. If the wireless communication device 602 determines that the NDI value indicates that the transmission does not carry new data, the wireless communication device 602 may determine that the transmission is a retransmission of the transport block. If the wireless communication device 602 determines that the NDI value indicates that the transmission carries new data, the wireless communication device 602 may determine that the transmission is a new transmission of the transport block. As another example, the wireless communication device 602 may determine that a transmission for a transport block is a new transmission of the transport block if no previous NDI has been received by the wireless communication device 602 for the transport block. As another example, the wireless communication device 602 may determine that a transmission for a transport block is a new transmission of the transport block if the HARQ process is equal to a broadcast HARQ process and if the transmission is a first received transmission of the transport block as indicated in a system information schedule by a radio resource control (RRC) communication. Otherwise, the wireless communication device 602 may determine that a transmission of a transport block is a retransmission of the transport block.

The wireless communication device 602 may attempt to decode the new transmission of the transport block. If the decoding attempt is successful, the wireless communication device 602 (or a MAC entity of the wireless communication device 602) may provide the decoded MAC protocol data unit(s) (PDU(s)) to upper layers of the wireless communication device 602. In some cases, the MAC entity may alternatively and/or additionally provide the decoded MAC PDU(s) to a disassembly and demultiplexing entity of the wireless communication device 602. The wireless communication device 602 may generate an ACK for the new transmission of the transport block and may transmit the ACK to the wireless communication device that transmitted the new transmission of the transport block to the wireless communication device 602.

If the decoding attempt for the new transmission of the transport block was not successful (e.g., such as in the example in FIG. 6B), the wireless communication device 602 (and/or the HARQ entity 604) may determine to add the other HARQ process (e.g., the HARQ Process 3) to the HARQ buffer 606 for the transport block. This may include storing soft bits (e.g., soft bits 410) in the HARQ buffer 606 for the transport block. The wireless communication device 602 may also generate a NACK and may transmit the NACK to the wireless communication device that transmitted the new transmission of the transport block to the wireless communication device 602.

At 614, the wireless communication device 602 (and/or the HARQ entity 604) may determine that a quantity of HARQ processes, including the HARQ processes maintained in the HARQ buffer 606 and the other HARQ process to be added to the HARQ buffer 606 for the transport block (e.g., the HARQ Process 3) does not satisfy a quantity threshold. As an example, the wireless communication device 602 (and/or the HARQ entity 604) may determine that the quantity is greater than a quantity that can be accommodated in the HARQ buffer 606. As another example, the wireless communication device 602 (and/or the HARQ entity 604) may determine that the quantity of bits allocated to each HARQ process in the HARQ buffer 606 plus the quantity of bits needed for the other HARQ process (e.g., the HARQ Process 3) is greater than the total quantity of bits allocated for the HARQ buffer 606. In other words, the wireless communication device 602 (and/or the HARQ entity 604) may determine that the wireless communication device 602 is memory constrained.

Accordingly, and at 616, the wireless communication device 602 (and/or the HARQ entity 604) may identify the HARQ process (e.g., the HARQ Process 2) for removal from the HARQ buffer 606 based at least in part on determining that the quantity of HARQ processes (or that the quantity of bits) does not satisfy the quantity threshold (e.g., exceeds the quantity allocated for the HARQ buffer 606). In other words, the wireless communication device 602 (and/or the HARQ entity 604) may identify the HARQ process (e.g., the HARQ Process 2) for removal from the HARQ buffer 606 based at least in part on determining that the wireless communication device 602 is memory constrained.

As indicated above, the wireless communication device 602 (and/or the HARQ entity 604) may identify the HARQ process based at least in part on the one or more HARQ buffer management parameters. The HARQ buffer management parameters enable the wireless communication device 602 (and/or the HARQ entity 604) to prioritize removal of HARQ processes from the HARQ buffer 606 such that higher priority HARQ processes are maintained in the HARQ buffer 606 and lower priority HARQ processes are removed from the HARQ buffer 606, if needed.

In some aspects, the one or more HARQ buffer management parameters include a HARQ process age parameter. The HARQ process age parameter enables the wireless communication device 602 (and/or the HARQ entity 604) to use a timestamp-based approach for HARQ process removal. The HARQ process age parameter may indicate that the wireless communication device 602 (and/or the HARQ entity 604) is to identify the oldest HARQ process for removal from the HARQ buffer 606. The HARQ entity 604 may maintain a sorted list of HARQ processes (e.g., maintained in the HARQ buffer 606) based on timestamps for when the HARQ processes are requested by a transmitter wireless communication device. When the wireless communication device 602 (and/or the HARQ entity 604) is to add the other HARQ process to the HARQ buffer 606, the wireless communication device 602 (and/or the HARQ entity 604) may remove the HARQ process with the oldest timestamp in the list and use the freed-up space in the HARQ buffer 606 for adding the other HARQ process. Accordingly, the wireless communication device 602 (and/or the HARQ entity 604) may identify the least recently used HARQ process, for removal from the HARQ buffer 606, based at least in part on the HARQ process age parameter.

In some aspects, the one or more HARQ buffer management parameters include a HARQ retransmission parameter. The HARQ retransmission parameter enables the wireless communication device 602 (and/or the HARQ entity 604) to use a retransmission count based approach for HARQ process removal. The HARQ retransmission parameter may indicate that the wireless communication device 602 (and/or the HARQ entity 604) is to identify the HARQ process with the greatest quantity of retransmissions (e.g., among the HARQ processes maintained in the HARQ buffer 606) for removal from the HARQ buffer 606. This enables the wireless communication device 602 (and/or the HARQ entity 604) to prioritize HARQ processes that experience fewer retransmissions over HARQ processes that experience a greater quantity of retransmissions. The HARQ entity 604 may maintain a sorted list of HARQ processes (e.g., maintained in the HARQ buffer 606) based on quantity of retransmissions. When the wireless communication device 602 (and/or the HARQ entity 604) is to add the other HARQ process to the HARQ buffer 606, the wireless communication device 602 (and/or the HARQ entity 604) may remove the HARQ process with the greatest quantity of retransmissions in the list and use the freed-up space in the HARQ buffer 606 for adding the other HARQ process. Accordingly, the wireless communication device 602 (and/or the HARQ entity 604) may identify, based at least in part on the HARQ retransmission parameter, the HARQ process (e.g., for removal from the HARQ buffer 606) based at least in part on a quantity of retransmissions for the HARQ process being a greatest quantity of retransmissions among the plurality of HARQ processes.

In some aspects, the one or more HARQ buffer management parameters include a carrier type parameter. The carrier type parameter enables the wireless communication device 602 (and/or the HARQ entity 604) to use a wireless carrier type based approach for HARQ process removal. The carrier type parameter may indicate that the wireless communication device 602 (and/or the HARQ entity 604) is to identify HARQ process(s) (e.g., maintained in the HARQ buffer 606) associated with secondary carriers allocated to the wireless communication device 602 for removal from the HARQ buffer 606. This enables the wireless communication device 602 (and/or the HARQ entity 604) to prioritize HARQ processes for the primary carriers allocated to the wireless communication device 602. Accordingly, the wireless communication device 602 (and/or the HARQ entity 604) may identify, based at least in part on the carrier type parameter, the HARQ process (e.g., for removal from the HARQ buffer 606) based at least in part on the HARQ processes being associated with a secondary carrier of the wireless communication device 602.

In some aspects, the one or more HARQ buffer management parameters include a decoding parameter. The decoding parameter enables the wireless communication device 602 (and/or the HARQ entity 604) to use a decoding result based approach for HARQ process removal. The decoding parameter may indicate that the wireless communication device 602 (and/or the HARQ entity 604) is to identify the HARQ process with the lowest decoding success rate for removal from the HARQ buffer 606. The HARQ entity 604 may maintain a sorted list of HARQ processes (e.g., maintained in the HARQ buffer 606) based on decoding success rates. When the wireless communication device 602 (and/or the HARQ entity 604) is to add the other HARQ process to the HARQ buffer 606, the wireless communication device 602 (and/or the HARQ entity 604) may remove the HARQ process with the lowest decoding success rate in the list and use the freed-up space in the HARQ buffer 606 for adding the other HARQ process. Accordingly, the wireless communication device 602 (and/or the HARQ entity 604) may identify, based at least in part on the decoding parameter, the HARQ process (e.g., for removal from the HARQ buffer 606) based at least in part on a decoding success rate for the HARQ process being a lowest decoding success rate among the plurality of HARQ processes maintained in the HARQ buffer 606.

In some aspects, the wireless communication device 602 (and/or the HARQ entity 604) identifies the HARQ process, for removal from the HARQ buffer 606, based at least in part on a plurality of the HARQ buffer management parameters described above. The HARQ entity 604 may implement a prioritization of the plurality of the HARQ buffer management parameters in a particular order. For example, the HARQ entity 604 may apply the HARQ retransmission parameter first, then the HARQ process age parameter, then the carrier type parameter. However, other prioritization orders for the plurality of HARQ buffer management parameters are within the scope of the present disclosure.

FIGS. 6C and 6D illustrate examples 600 where the wireless communication device 602 (and/or the HARQ entity 604) proactively identifies the HARQ process for removal from the HARQ buffer 606. In particular, at 618 in FIGS. 6C and 6D, the wireless communication device 602 (and/or the HARQ entity 604) identifies stale and/or unused HARQ processes for removal from the HARQ buffer 606 based at least in part on one or more timers. Referring to the example 500 of FIG. 5, the HARQ Process 0 may become stale and/or unused after 516 as the wireless communication device 502a switched to using the HARQ Process 2 and abandoned usage of the HARQ Process 0. The examples 600 illustrated in FIGS. 6C and 6D enable the wireless communication device 602 to identify stale and/or unused HARQ processes that have been abandoned by a transmitter wireless communication device so that these HARQ processes can be removed to free up bits and/or space in the HARQ buffer 606 for more active HARQ processes. The techniques described in the examples 600 illustrated in FIGS. 6C and 6D may be used in other communication scenarios as well.

FIG. 6C illustrates in example 600 where the wireless communication device 602 (and/or the HARQ entity 604) uses a plurality of timers to track the usage of HARQ processes in the HARQ buffer 606. For example, the wireless communication device 602 (and/or the HARQ entity 604) may use a global timer or maximum HARQ process timer $T_{max\_retx}$ and a periodic HARQ process timer $T_{check}$. The maximum HARQ process timer $T_{max\_retx}$ is used for tracking the maximal duration of a HARQ process starting from reception of a control communication, that schedules or configures transmission of one or more transport blocks of a data communication to the wireless communication device 602, to the last transmission (or retransmission) of the last transport block of the data communication. The control communication may include a downlink control information (DCI) communication, a MAC control element (MAC-CE) communication, an RRC communication, and/or another type of control communication. The wireless communication device 602 (and/or the HARQ entity 604) may initialize the duration of the maximum HARQ process timer $T_{max\_retx}$ to 0 when a wireless carrier is configured for the data communication. Alternatively, the maximum HARQ process timer $T_{max\_retx}$ may be initialized with an associated radio link control (RLC) assembly timer or based at least in part on a quantity of HARQ processes configured in an RRC communication. The maximum HARQ process timer $T_{max\_retx}$ may be used to reduce the likelihood of the wireless communication device 602 (and/or the HARQ entity 604) prematurely removing a HARQ processes.

The wireless communication device 602 (and/or the HARQ entity 604) uses the periodic HARQ process timer $T_{check}$ to periodically check and determine whether the maximum HARQ process timer $T_{max\_retx}$ has expired. In case of multiple HARQ processes maintained in the HARQ buffer 606, the wireless communication device 602 (and/or the HARQ entity 604) may maintain a periodic HARQ process timer $T_{check}$ per HARQ process if the wireless communication device 602 has the available processing resources and memory resources for doing so. A periodic HARQ process timer $T_{check}$ may alternatively and/or additionally be shared across all HARQ processes.

The wireless communication device 602 (and/or the HARQ entity 604) may identify a HARQ process (e.g., the HARQ Process 0) for removal from the HARQ buffer 606 based at least in part on determining that the maximum HARQ process timer $T_{max\_retx}$ has expired and the periodic HARQ process timer $T_{check}$ has expired. For example, the wireless communication device 602 (and/or the HARQ entity 604) may determine that the periodic HARQ process timer $T_{check}$ has expired for the HARQ Process 0 after the third transmission (Tx 2) associated with the HARQ Process 0, and accordingly may determine whether the maximum HARQ process timer $T_{max\_retx}$ has expired. If the wireless communication device 602 (and/or the HARQ entity 604) determines that the maximum HARQ process timer $T_{max\_retx}$ has not expired at expiration of the periodic HARQ process timer $T_{check}$, the wireless communication device 602 (and/or the HARQ entity 604) may reset or reinitialize the periodic HARQ process timer $T_{check}$ to 0 and may check again for expiration of the maximum HARQ process timer $T_{max\_retx}$ after expiration of the periodic HARQ process timer $T_{check}$. If the wireless communication device 602 (and/or the HARQ entity 604) determines that the maximum HARQ process timer $T_{max\_retx}$ has expired, the wireless communication device 602 (and/or the HARQ entity 604) may identify the HARQ Process 0 for removal from the HARQ buffer 606.

FIG. 6D illustrates in example 600 where the wireless communication device 602 (and/or the HARQ entity 604) uses a maximum HARQ timer $T_{max\_next}$ to track the usage of HARQ processes in the HARQ buffer 606. The wireless communication device 602 (and/or the HARQ entity 604) may initialize the maximum HARQ timer $T_{max\_next}$ after each transmission or retransmission associated with a HARQ process (e.g., the HARQ Process 0), and may determine whether the maximum HARQ timer $T_{max\_next}$ expires prior to reception of a subsequent transmission for the HARQ process.

As an example, the wireless communication device 602 may receive a first transmission (Tx 0) associated with the HARQ Process 0 and may accordingly initialize the maximum HARQ timer $T_{max\_next}$ for the HARQ Process 0. If the maximum HARQ timer $T_{max\_next}$ expires prior to reception of a second transmission (Tx 1), the wireless communication device 602 (and/or the HARQ entity 604) may remove the HARQ Process 0 from the HARQ buffer 606. If the second transmission is received prior to expiration of the maximum HARQ timer $T_{max\_next}$, the wireless communication device 602 (and/or the HARQ entity 604) resets or reinitializes the maximum HARQ timer $T_{max\_next}$ to 0 based at least in part on reception of the second transmission.

If the maximum HARQ timer $T_{max\_next}$ expires prior to reception of a third transmission (Tx 2), the wireless communication device 602 (and/or the HARQ entity 604) may remove the HARQ Process 0 from the HARQ buffer 606. If the third transmission is received prior to expiration of the maximum HARQ timer $T_{max\_next}$, the wireless communication device 602 (and/or the HARQ entity 604) resets or reinitializes the maximum HARQ timer $T_{max\_next}$ to 0 based at least in part on reception of the third transmission. The wireless communication device 602 (and/or the HARQ entity 604) may continue this process until all transmissions and/or retransmissions for the HARQ Process 0 are received, or until the HARQ Process 0 is removed from the HARQ buffer 606.

In some aspects, the wireless communication device 602 (and/or the HARQ entity 604) determines the timer duration of the maximum HARQ timer $T_{max\_next}$ based at least in part on one or more parameters. For example, the wireless communication device 602 (and/or the HARQ entity 604) determines the timer duration based at least in part on a quantity of HARQ processes configured for the wireless communication device 602 ($N_{rrc}$) and a quantity of active HARQ processes for the wireless communication device 602 ($N_{active}$). As an example, if $N_{rrc}$ is 16 HARQ processes and the frequency division duplexing (FDD) configuration for the wireless communication device 602 includes a 15 kilohertz (kHz) subcarrier spacing (SCS), the wireless communication device 602 (and/or the HARQ entity 604) may determine the maximum HARQ timer $T_{max\_next}$ to be less than or equal to 16 seconds. If in the last 't' seconds, $N_{active}$ is equal to 3 HARQ processes, the wireless communication device 602 (and/or the HARQ entity 604) may determine the maximum HARQ timer $T_{max\_next}$ to be greater than or equal to 3. Thus, the wireless communication device 602 (and/or the HARQ entity 604) may determine the maximum HARQ timer $T_{max\_next}$ to be in the range [$N_{active}$, $N_{rrc}$].

As another example, the wireless communication device 602 (and/or the HARQ entity 604) determines the timer duration for the maximum HARQ timer $T_{max\_next}$ based at least in part on an indication of the timer duration for the maximum HARQ timer $T_{max\_next}$ received from a transmitter wireless communication device. The indication may be received in a MAC-CE communication, a DCI communication, a physical downlink control channel (PDCCH) communication, an RRC communication, and/or another type of communication.

As another example, the wireless communication device 602 (and/or the HARQ entity 604) determines the timer duration for the maximum HARQ timer $T_{max\_next}$ using a machine learning model. In some implementations, the wireless communication device 602 (and/or the HARQ entity 604) uses the machine learning model to determine the timer duration for the maximum HARQ timer $T_{max\_next}$ by providing candidate parameters as input to the machine learning model, and using the machine learning model to determine the timer duration for the maximum HARQ timer $T_{max\_next}$ using the candidate parameters in the machine learning model. The candidate parameters may include, for example, a maximum quantity of HARQ processes for the wireless communication device 602, a numerology used in wireless communication for the wireless communication device 602, and/or a single HARQ retransmission duration, among other examples.

The wireless communication device 602 (and/or the HARQ entity 604) may train, update, and/or refine the machine learning model to increase the accuracy of the outcomes and/or parameters determined using the machine learning model. The wireless communication device 602 (and/or the HARQ entity 604) may train, update, and/or refine the machine learning model based on feedback and/or results from the subsequent HARQ process removal operations, as well as from historical or related HARQ process removal operations (e.g., from hundreds, thousands, or more historical or related HARQ process removal operations operations) performed by the wireless communication device 602 (and/or the HARQ entity 604).

Additionally and/or alternatively, the transmitter wireless communication device may indicate, in the downlink control communication that scheduled or configured the data communication associated with the HARQ Process 0, that the transmission on the HARQ Process 0 is the last transmission. In this way, the wireless communication device 602 may receive the indication and may identify the HARQ Process 0 for removal from the HARQ buffer 606 based at least in part on the indication.

Additionally and/or alternatively, the transmitter wireless communication device may indicate (e.g., in a DCI communication, a MAC-CE communication, an RRC communication) a maximum quantity of parallel HARQ processes for the wireless communication device 602. In this way, the wireless communication device 602 may receive the indication and may identify the HARQ Process 0 for removal from the HARQ buffer 606 based at least in part on the indication.

Figure 6E:
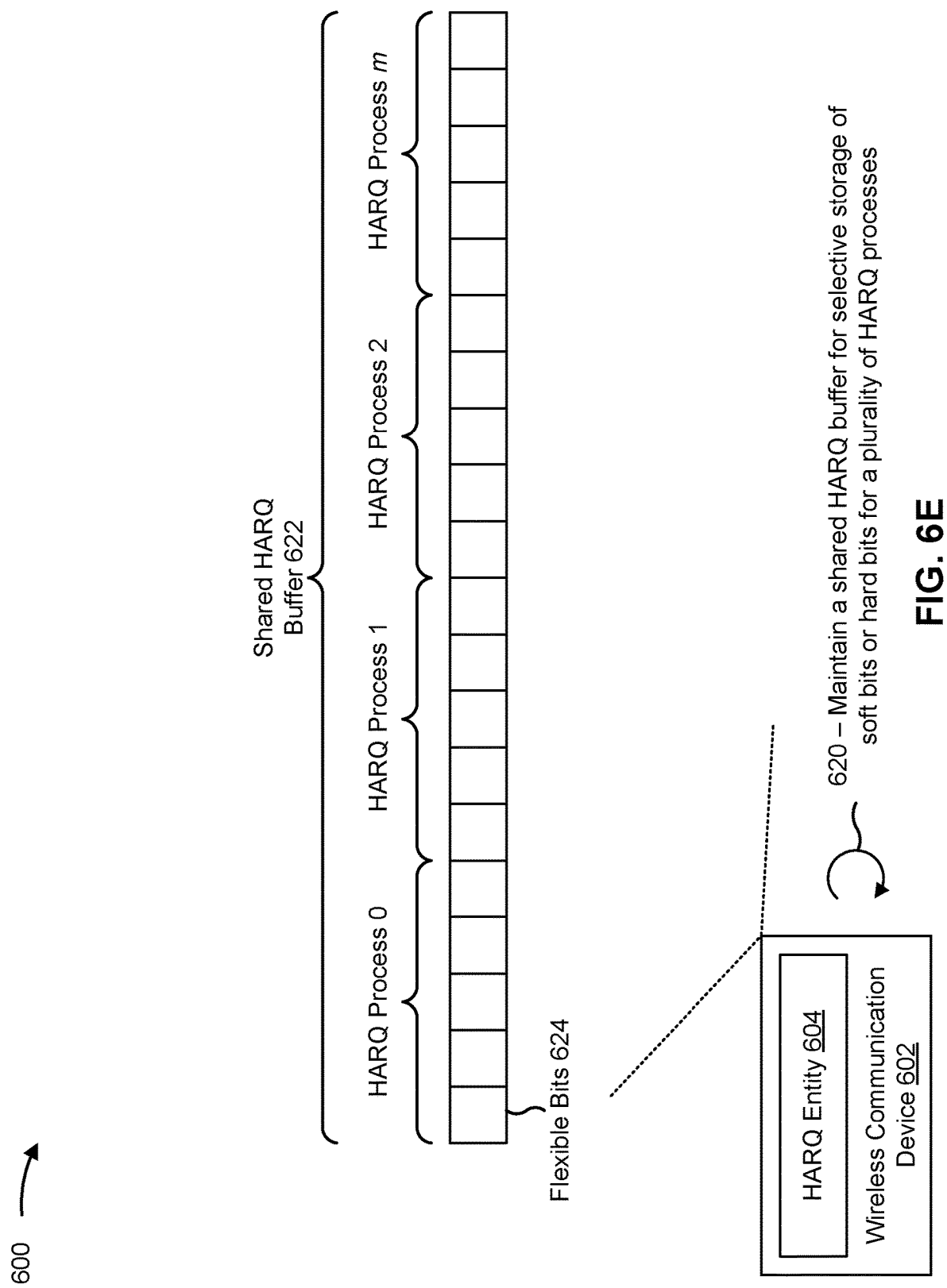

FIG. 6E illustrates an example 600 where the wireless communication device 602 (and/or the HARQ entity 604) maintains a shared HARQ buffer 622 for the HARQ buffer 606. As shown in FIG. 6E, and at 620, the wireless communication device 602 (and/or the HARQ entity 604) maintains the shared HARQ buffer 622 for selective storage of soft bits (e.g., soft bits 410) or hard bits (e.g., hard bits 412) for a plurality of HARQ processes. The wireless communication device 602 (and/or the HARQ entity 604) selectively stores soft bits or hard bits for a HARQ process in a plurality of flexible bits 624. Flexible bits 624 are bits that may be used for storing soft bits or hard bits (e.g., but not both at the same time).

As an example of the above, the flexible bits 624 for the HARQ Process 0 may be used to store soft bits for the HARQ Process 0 or hard bits for the HARQ Process 0 at a given time, but not both at the same time. This enables the wireless communication device 602 (and/or the HARQ entity 604) to maintain a single HARQ buffer as opposed to multiple HARQ buffers as shown in the example 400 in FIG. 4. This reduces the complexity of implementing HARQ for the wireless communication device 602 and reduces resource consumption (e.g., processing resource consumption, memory resource consumption) of the wireless communication device 602 for implementing HARQ.

The quantity of flexible bits 624 allocated to a HARQ process may correspond to the greater of the quantity of soft bits allocated to the HARQ process or the quantity of hard bits allocated to the HARQ process. For example, if 4 soft bits are allocated to the HARQ Process 1 and 1 hard bit is allocated to the HARQ Process 1, the quantity of flexible bits 624 allocated to the HARQ Process 1 may be 4 bits. In this way, the flexible bits 624 can store the 4 soft bits for the HARQ Process 1 or the 1 hard bit for the HARQ Process 1 at a given time.

The wireless communication device 602 (and/or the HARQ entity 604) may selectively store soft bits or hard bits for a HARQ process based at least in part on an outcome of a decoding attempt associated with the HARQ process. For example, the wireless communication device 602 (and/or the HARQ entity 604) may determine that a decoding attempt for a transmission of a transport block associated with the HARQ Process 2 was not successful and may store soft bits (and not hard bits) in the flexible bits 624 for the HARQ Process 2 based at least in part on determining that the decoding attempt was not successful. As another example, the wireless communication device 602 (and/or the HARQ entity 604) may determine that a decoding attempt for a transmission of a transport block associated with the HARQ Process 2 was successful and may store hard bit(s) (and not soft bits) in the flexible bits 624 for the HARQ Process 2 based at least in part on determining that the decoding attempt was successful.

As indicated above, FIGS. 6A-6E are provided as examples. Other examples may differ from what is described with regard to FIGS. 6A-6E.

Figure 7:
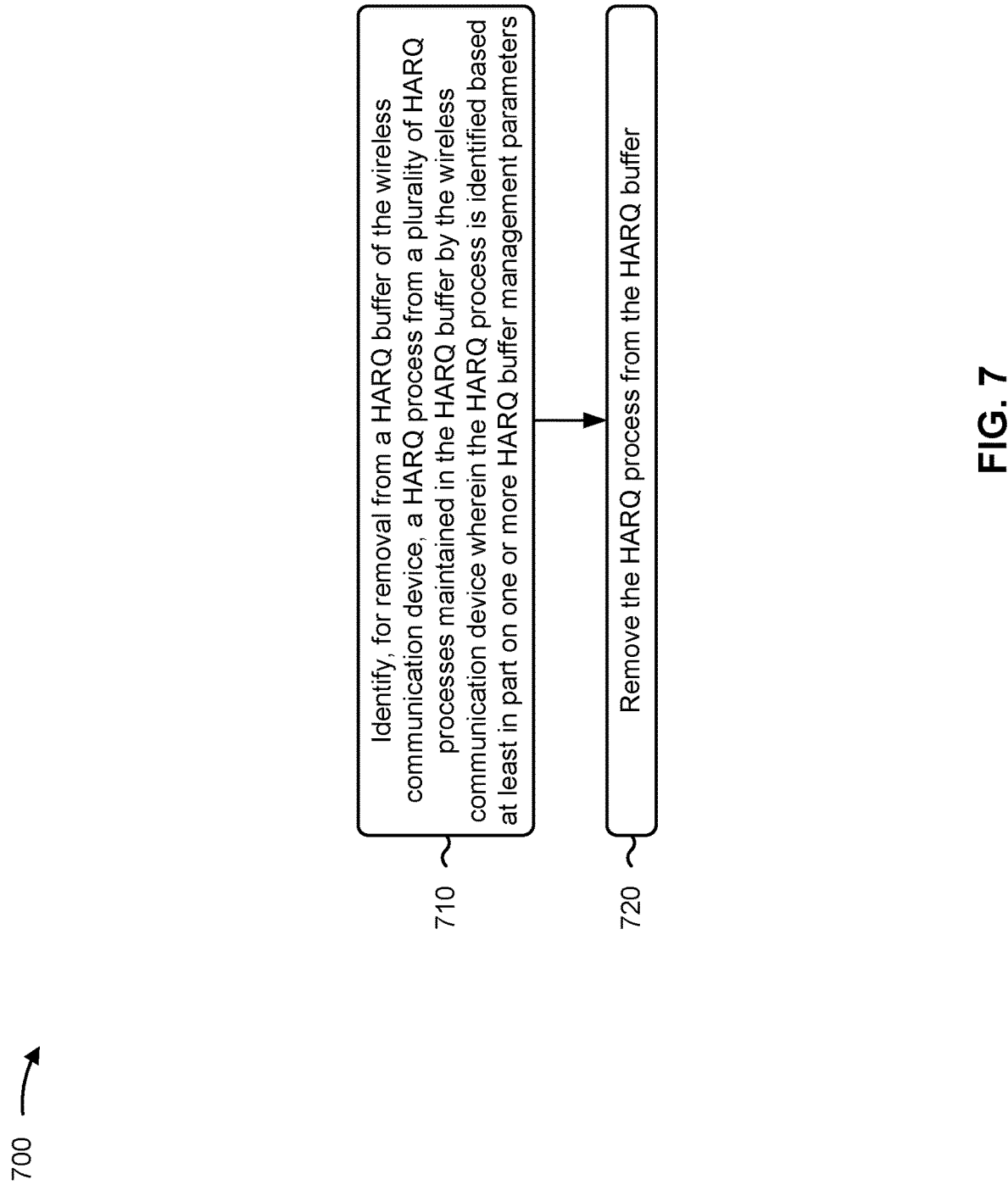
FIGS. 7-9 are diagrams illustrating example processes associated with HARQ buffer management, in accordance with the present disclosure.

FIG. 7 is a diagram illustrating an example process 700 performed, for example, by a wireless communication device, in accordance with the present disclosure. Example process 700 is an example where the wireless communication device (e.g., a base station 110, a UE 120, a DU 330, an RU 340, a wireless communication device 602) performs operations associated with HARQ buffer management.

As shown in FIG. 7, in some aspects, process 700 may include identifying, for removal from a HARQ buffer of the wireless communication device, a HARQ process from a plurality of HARQ processes maintained in the HARQ buffer by the wireless communication device, wherein the HARQ process is identified based at least in part on one or more HARQ buffer management parameters (block 710). For example, the wireless communication device (e.g., using the communication manager 140, the communication manager 150, the HARQ entity 604, the communication manager 1008, and/or identification component 1010, depicted in FIG. 10) may identify, for removal from a HARQ buffer of the wireless communication device, a HARQ process from a plurality of HARQ processes maintained in the HARQ buffer by the wireless communication device, as described above. In some aspects, the HARQ process is identified based at least in part on one or more HARQ buffer management parameters.

As further shown in FIG. 7, in some aspects, process 700 may include removing the HARQ process from the HARQ buffer (block 720). For example, the wireless communication device (e.g., using the communication manager 140, the communication manager 150, the HARQ entity 604, the communication manager 1008, and/or removal component 1012, depicted in FIG. 10) may remove the HARQ process from the HARQ buffer, as described above.

Process 700 may include additional aspects, such as any single aspect or any combination of aspects described below and/or in connection with one or more other processes described elsewhere herein.

In a first aspect, process 700 includes determining to add another HARQ process to the HARQ buffer, and determining that a quantity of HARQ processes, including the plurality of HARQ processes and the other HARQ process, does not satisfy a quantity threshold for the HARQ buffer, and identifying the HARQ process from the plurality of HARQ processes comprises identifying the HARQ process based at least in part on determining that the quantity of HARQ processes does not satisfy the quantity threshold for the HARQ buffer.

In a second aspect, alone or in combination with the first aspect, the one or more HARQ buffer management parameters comprise a HARQ process age parameter, and identifying the HARQ process from the plurality of HARQ processes comprises identifying, based at least in part on the HARQ process age parameter, the HARQ process based at least in part on the HARQ process being a least recently used HARQ process of the plurality of HARQ processes.

In a third aspect, alone or in combination with one or more of the first and second aspects, the one or more HARQ buffer management parameters comprise a HARQ retransmission parameter, and identifying the HARQ process from the plurality of HARQ processes comprises identifying, based at least in part on the HARQ retransmission parameter, the HARQ process based at least in part on a quantity of retransmissions for the HARQ process being a greatest quantity of retransmissions among the plurality of HARQ processes.

In a fourth aspect, alone or in combination with one or more of the first through third aspects, the one or more HARQ buffer management parameters comprise a carrier type parameter, and identifying the HARQ process from the plurality of HARQ processes comprises identifying, based at least in part on the carrier type parameter, the HARQ process based at least in part on the HARQ process being associated with a secondary carrier of the wireless communication device.

In a fifth aspect, alone or in combination with one or more of the first through fourth aspects, the one or more HARQ buffer management parameters comprise a decoding parameter, and identifying the HARQ process from the plurality of HARQ processes comprises identifying, based at least in part on the decoding parameter, the HARQ process based at least in part on a decoding success rate for the HARQ process being a lowest decoding success rate among the plurality of HARQ processes.

In a sixth aspect, alone or in combination with one or more of the first through fifth aspects, the one or more HARQ buffer management parameters comprise a periodic HARQ process timer, and a maximum HARQ process timer, and identifying the HARQ process from the plurality of HARQ processes comprises identifying the HARQ process based at least in part on determining that at least one of the periodic HARQ process timer has expired or the maximum HARQ process timer has expired.

In a seventh aspect, alone or in combination with one or more of the first through sixth aspects, the HARQ buffer comprises a shared HARQ buffer that is sized for storing only soft bits or only hard bits, and process 700 further comprises determining, for another HARQ process of the plurality of HARQ processes, whether a decoding attempt for a communication associated with the other HARQ process was successful, and selectively storing, in the shared HARQ buffer, one or more soft bits for the communication or one or more hard bits for the communication based at least in part on whether the decoding attempt was successful.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
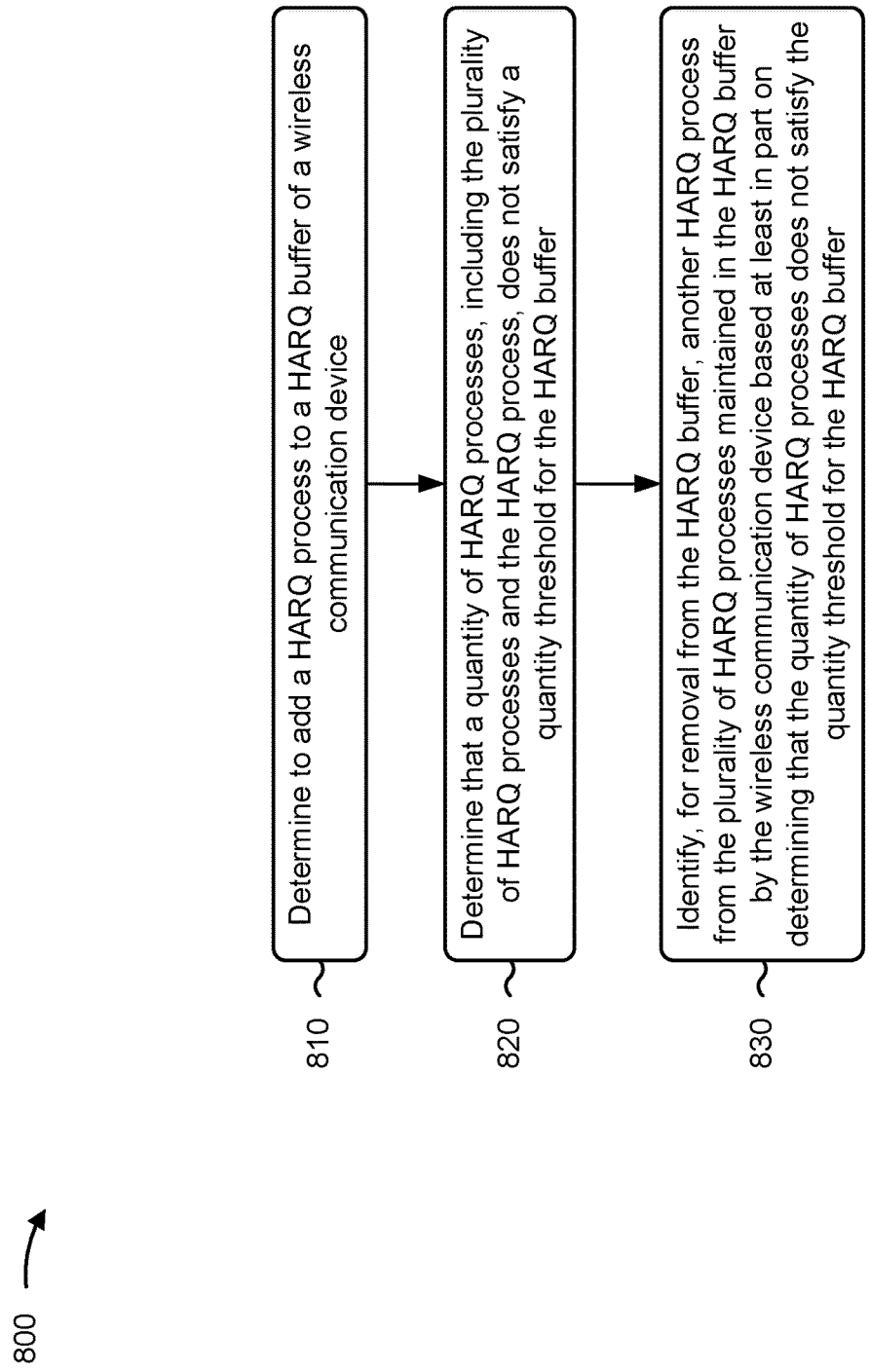

FIG. 8 is a diagram illustrating an example process 800 performed, for example, by a wireless communication device, in accordance with the present disclosure. Example process 800 is an example where the wireless communication device (e.g., a base station 110, a UE 120, a DU 330, an RU 340, a wireless communication device 602) performs operations associated with HARQ buffer management.

As shown in FIG. 8, in some aspects, process 800 may include determining to add a HARQ process to a HARQ buffer of the wireless communication device (block 810). For example, the wireless communication device (e.g., using the communication manager 140, the communication manager 150, the HARQ entity 604, the communication manager 1008, and/or determination component 1014, depicted in FIG. 10) may determine to add a HARQ process to a HARQ buffer of the wireless communication device, as described above in connection with FIGS. 6A-6E. In some aspects, the wireless communication device maintains a plurality of HARQ processes in the HARQ buffer.

As further shown in FIG. 8, in some aspects, process 800 may include determining that a quantity of HARQ processes, including the plurality of HARQ processes and the HARQ process, does not satisfy a quantity threshold for the HARQ buffer (block 820). For example, the wireless communication device (e.g., using the communication manager 140, the communication manager 150, the HARQ entity 604, the communication manager 1008, and/or determination component 1014, depicted in FIG. 10) may determine that a quantity of HARQ processes, including the plurality of HARQ processes and the HARQ process, does not satisfy a quantity threshold for the HARQ buffer, as described above in connection with FIGS. 6A-6E.

As further shown in FIG. 8, in some aspects, process 800 may include identifying, for removal from the HARQ buffer, another HARQ process from the plurality of HARQ processes maintained in the HARQ buffer by the wireless communication device based at least in part on determining that the quantity of HARQ processes does not satisfy the quantity threshold for the HARQ buffer (block 830). For example, the wireless communication device (e.g., using the communication manager 140, the communication manager 150, the HARQ entity 604, the communication manager 1008, and/or identification component 1010, depicted in FIG. 10) may identify, for removal from the HARQ buffer, another HARQ process from the plurality of HARQ processes maintained in the HARQ buffer by the wireless communication device based at least in part on determining that the quantity of HARQ processes does not satisfy the quantity threshold for the HARQ buffer, as described above in connection with FIGS. 6A-6E.

Process 800 may include additional aspects, such as any single aspect or any combination of aspects described below and/or in connection with one or more other processes described elsewhere herein.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
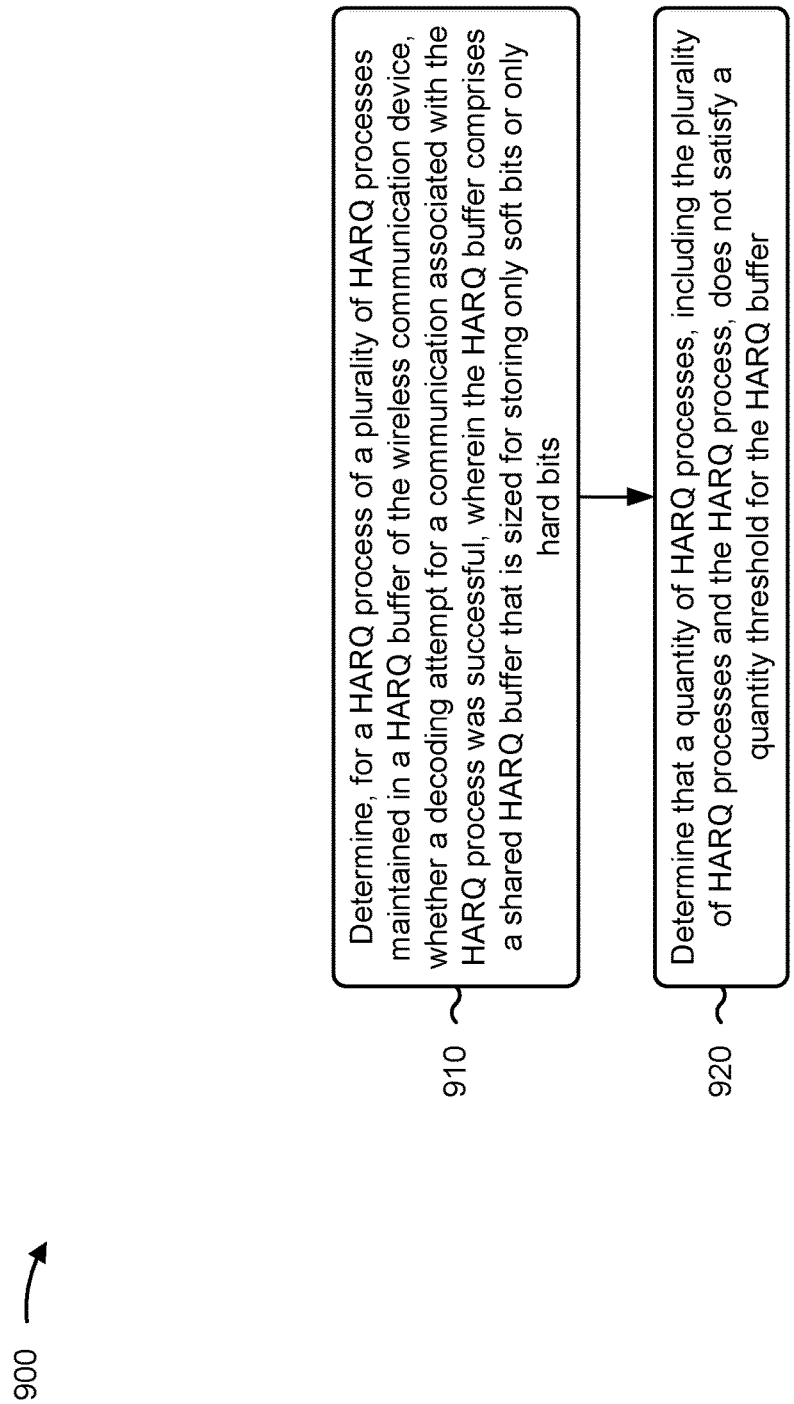

FIG. 9 is a diagram illustrating an example process 900 performed, for example, by a wireless communication device, in accordance with the present disclosure. Example process 900 is an example where the wireless communication device (e.g., a base station 110, a UE 120, a DU 330, an RU 340, a wireless communication device 602) performs operations associated with HARQ buffer management.

As shown in FIG. 9, in some aspects, process 900 may include determining, for a HARQ process of a plurality of HARQ processes maintained in a HARQ buffer of the wireless communication device, whether a decoding attempt for a communication associated with the HARQ process was successful, wherein the HARQ buffer comprises a shared HARQ buffer that is sized for storing only soft bits or only hard bits (block 910). For example, the wireless communication device (e.g., using the communication manager 140, the communication manager 150, the HARQ entity 604, the communication manager 1008, and/or determination component 1014, depicted in FIG. 10) may determine, for a HARQ process of a plurality of HARQ processes maintained in a HARQ buffer of the wireless communication device, whether a decoding attempt for a communication associated with the HARQ process was successful, as described above in connection with FIGS. 6A-6E. In some aspects, the HARQ buffer comprises a shared HARQ buffer that is sized for storing only soft bits or only hard bits.

As further shown in FIG. 9, in some aspects, process 900 may include selectively storing, in the shared HARQ buffer, one or more soft bits for the communication or one or more hard bits for the communication based at least in part on whether the decoding attempt was successful (block 920). For example, the wireless communication device (e.g., using the communication manager 140, the communication manager 150, the HARQ entity 604, the communication manager 1008, and/or storing component 1016, depicted in FIG. 10) may selectively store, in the shared HARQ buffer, one or more soft bits for the communication or one or more hard bits for the communication based at least in part on whether the decoding attempt was successful, as described above in connection with FIGS. 6A-6E.

Process 9 may include additional aspects, such as any single aspect or any combination of aspects described below and/or in connection with one or more other processes described elsewhere herein.

In a first aspect, selectively storing the one or more soft bits or the one or more hard bits comprises storing the one or more soft bits in the shard HARQ buffer based at least in part on determining that the decoding attempt was not successful. In a second aspect, selectively storing the one or more soft bits or the one or more hard bits comprises storing the one or more hard bits in the shard HARQ buffer based at least in part on determining that the decoding attempt was successful.

Although FIG. 9 shows example blocks of process 00, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
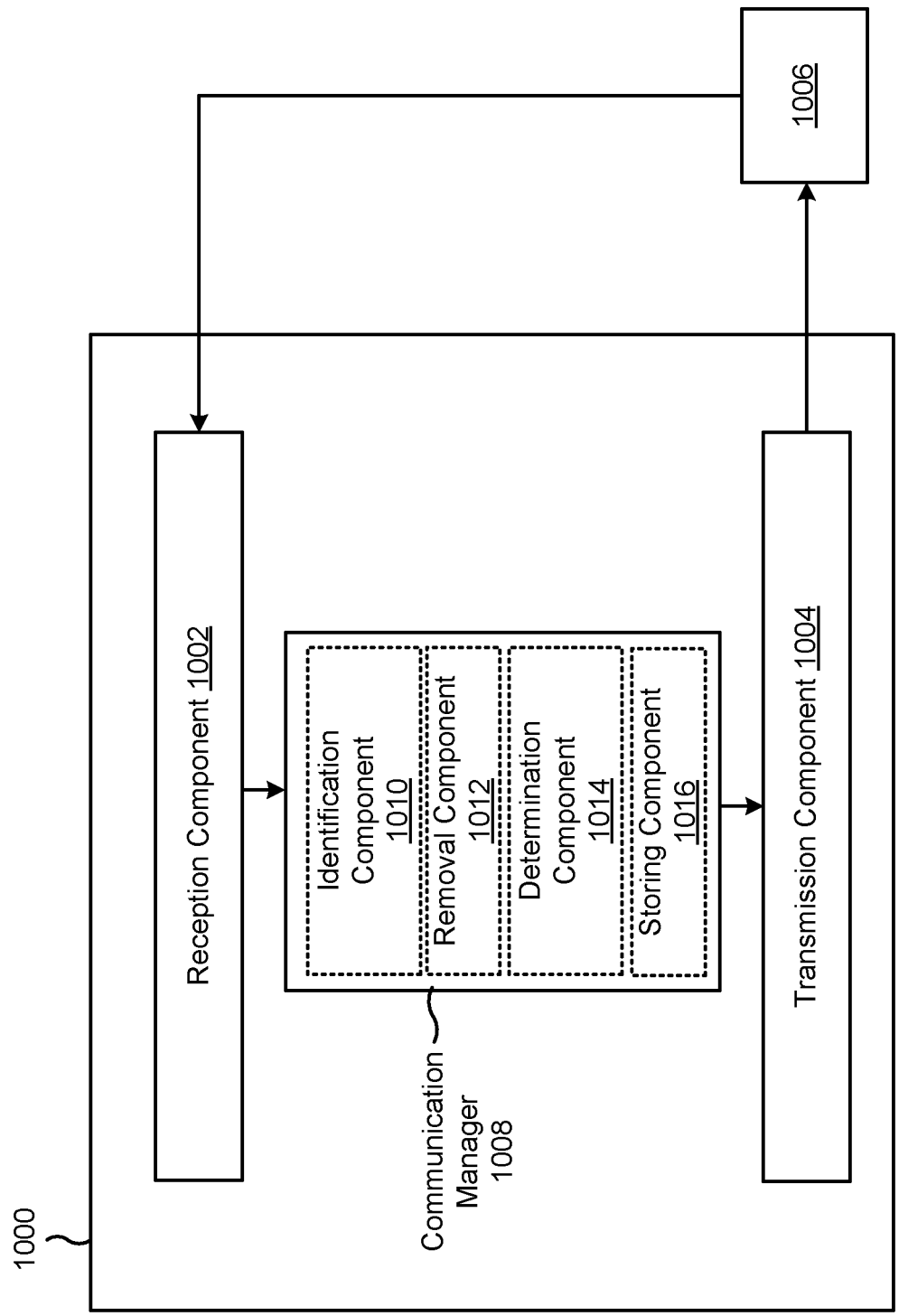
FIG. 10 is a diagram of an example apparatus for wireless communication, in accordance with the present disclosure.

FIG. 10 is a diagram of an example apparatus 1000 for wireless communication. The apparatus 1000 may be a wireless communication device (e.g., a base station 110, a UE 120, a DU 330, an RU 340, a wireless communication device 602), or a wireless communication device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., a communication manager 140, a communication manager 150). The communication manager 1008 may include one or more of an identification component 1010, a removal component 1012, a determination component 1014, and/or a storing component 1016, among other examples.

In some aspects, the apparatus 1000 may be configured to perform one or more operations described herein in connection with FIGS. 6A-6E. Additionally, or alternatively, the apparatus 1000 may be configured to perform one or more processes described herein, such as process 700 of FIG. 7, process 800 of FIG. 8, process 900 of FIG. 9, or a combination thereof. In some aspects, the apparatus 1000 and/or one or more components shown in FIG. 10 may include one or more components of the base station 110 or the UE 120 described in connection with FIG. 2. Additionally, or alternatively, one or more components shown in FIG. 10 may be implemented within one or more components described in connection with FIG. 2. Additionally, or alternatively, one or more components shown in FIG. 10 may be implemented within and/or by the HARQ entity 604. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station 110 or the UE 120 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station 110 or the UE 120 described in connection with FIG. 2. In some aspects, the transmission component 1004 may be co-located with the reception component 1002 in a transceiver.

The identification component 1010 may identify, for removal from a HARQ buffer of the wireless communication device, a HARQ process from a plurality of HARQ processes maintained in the HARQ buffer by the apparatus 1000. The identification component 1010 may identify the HARQ process based at least in part on one or more HARQ buffer management parameters. The removal component 1012 may remove the HARQ process from the HARQ buffer.

The determination component 1014 may determine to add another HARQ process to the HARQ buffer. The determination component 1014 may determine that a quantity of HARQ processes, including the plurality of HARQ processes and the other HARQ process, does not satisfy a quantity threshold for the HARQ buffer. The identification component 1010 may identify the HARQ process based at least in part on the determination by the determination component 1014 that the quantity of HARQ processes does not satisfy the quantity threshold for the HARQ buffer.

In some aspects, the HARQ buffer comprises a shared HARQ buffer that is sized for storing only soft bits or only hard bits. The determination component 1014 may determine, for another HARQ process of the plurality of HARQ processes, whether a decoding attempt for a communication associated with the other HARQ process was successful. The storing component 1016 may selectively store, in the shared HARQ buffer, one or more soft bits for the communication or one or more hard bits for the communication based at least in part on whether the determination component 1014 determines that the decoding attempt was successful.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a wireless communication device, comprising: identifying, for removal from a hybrid automatic repeat request (HARQ) buffer of the wireless communication device, a HARQ process from a plurality of HARQ processes maintained in the HARQ buffer by the wireless communication device, wherein the HARQ process is identified based at least in part on one or more HARQ buffer management parameters; and removing the HARQ process from the HARQ buffer.

Aspect 2: The method of Aspect 1, further comprising: determining to add another HARQ process to the HARQ buffer; and determining that a quantity of HARQ processes, including the plurality of HARQ processes and the other HARQ process, does not satisfy a quantity threshold for the HARQ buffer; and wherein identifying the HARQ process from the plurality of HARQ processes comprises: identifying the HARQ process based at least in part on determining that the quantity of HARQ processes does not satisfy the quantity threshold for the HARQ buffer, wherein identifying the HARQ process from the plurality of HARQ processes comprises: identifying the HARQ process based at least in part on determining that the quantity of HARQ processes does not satisfy the quantity threshold for the HARQ buffer.

Aspect 3: The method of Aspect 1 or 2, wherein the one or more HARQ buffer management parameters comprise a HARQ process age parameter; and wherein identifying the HARQ process from the plurality of HARQ processes comprises: identifying, based at least in part on the HARQ process age parameter, the HARQ process based at least in part on the HARQ process being a least recently used HARQ process of the plurality of HARQ processes.

Aspect 4: The method of one or more of Aspects 1-3, wherein the one or more HARQ buffer management parameters comprise a HARQ retransmission parameter; and wherein identifying the HARQ process from the plurality of HARQ processes comprises: identifying, based at least in part on the HARQ retransmission parameter, the HARQ process based at least in part on a quantity of retransmissions for the HARQ process being a greatest quantity of retransmissions among the plurality of HARQ processes.

Aspect 5: The method of one or more of Aspects 1-4, wherein the one or more HARQ buffer management parameters comprise a carrier type parameter; and wherein identifying the HARQ process from the plurality of HARQ processes comprises: identifying, based at least in part on the carrier type parameter, the HARQ process based at least in part on the HARQ process being associated with a secondary carrier of the wireless communication device.

Aspect 6: The method of one or more of Aspects 1-5, wherein the one or more HARQ buffer management parameters comprise a decoding parameter; and wherein identifying the HARQ process from the plurality of HARQ processes comprises: identifying, based at least in part on the decoding parameter, the HARQ process based at least in part on a decoding success rate for the HARQ process being a lowest decoding success rate among the plurality of HARQ processes.

Aspect 7: The method of one or more of Aspects 1-6, wherein the one or more HARQ buffer management parameters comprise: a periodic HARQ process timer; and a maximum HARQ process timer; and wherein identifying the HARQ process from the plurality of HARQ processes comprises: identifying the HARQ process based at least in part on determining that at least one of the periodic HARQ process timer has expired or the maximum HARQ process timer has expired.

Aspect 8: The method of one or more of Aspects 1-7, wherein the HARQ buffer comprises a shared HARQ buffer that is sized for storing only soft bits or only hard bits; and wherein the method further comprises: determining, for another HARQ process of the plurality of HARQ processes, whether a decoding attempt for a communication associated with the other HARQ process was successful; and selectively storing, in the shared HARQ buffer, one or more soft bits for the communication or one or more hard bits for the communication based at least in part on whether the decoding attempt was successful.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
   identifying, for removal from a hybrid automatic repeat request (HARQ) buffer of the wireless communication device, a HARQ process from a plurality of HARQ processes maintained in the HARQ buffer by the wireless communication device,
      wherein the HARQ process is identified for removal based at least in part on a plurality of HARQ buffer management parameters; and
   removing the HARQ process from the HARQ buffer, wherein removing the HARQ process comprises removing one or more soft bits of the HARQ process from the HARQ buffer and maintaining one or more hard bits in the HARQ buffer.

2. The method of claim 1, further comprising:
   determining to add another HARQ process to the HARQ buffer; and
   determining that a quantity of HARQ processes, including the plurality of HARQ processes and the other HARQ process, does not satisfy a quantity threshold for the HARQ buffer; and
   wherein identifying the HARQ process from the plurality of HARQ processes comprises:
      identifying the HARQ process based at least in part on determining that the quantity of HARQ processes does not satisfy the quantity threshold for the HARQ buffer.

3. The method of claim 1,
   wherein the plurality of HARQ buffer management parameters comprise a HARQ process age parameter; and
   wherein identifying the HARQ process from the plurality of HARQ processes comprises:
      identifying, based at least in part on the HARQ process age parameter, the HARQ process based at least in part on the HARQ process being a least recently used HARQ process of the plurality of HARQ processes.

4. The method of claim 1,
   wherein the plurality of HARQ buffer management parameters comprise a HARQ retransmission parameter; and
   wherein identifying the HARQ process from the plurality of HARQ processes comprises:
      identifying, based at least in part on the HARQ retransmission parameter, the HARQ process based at least in part on a quantity of retransmissions for the HARQ process being a greatest quantity of retransmissions among the plurality of HARQ processes.

5. The method of claim 1,
   wherein the plurality of HARQ buffer management parameters comprise a carrier type parameter; and wherein identifying the HARQ process from the plurality of HARQ processes comprises:
identifying, based at least in part on the carrier type parameter, the HARQ process based at least in part on the HARQ process being associated with a secondary carrier of the wireless communication device.

6. The method of claim 1,
wherein the plurality of HARQ buffer management parameters comprise a decoding parameter; and
wherein identifying the HARQ process from the plurality of HARQ processes comprises:
identifying, based at least in part on the decoding parameter, the HARQ process based at least in part on a decoding success rate for the HARQ process being a lowest decoding success rate among the plurality of HARQ processes.

7. The method of claim 1,
wherein the plurality of HARQ buffer management parameters comprise:
a periodic HARQ process timer; and
a maximum HARQ process timer; and
wherein identifying the HARQ process from the plurality of HARQ processes comprises:
identifying the HARQ process based at least in part on determining that at least one of the periodic HARQ process timer has expired or the maximum HARQ process timer has expired.

8. The method of claim 1,
wherein the HARQ buffer comprises a shared HARQ buffer that is sized for storing soft bits or hard bits; and
wherein the method further comprises:
determining, for another HARQ process of the plurality of HARQ processes, whether a decoding attempt for a communication associated with the other HARQ process was successful; and
selectively storing, in the shared HARQ buffer, one or more soft bits for the communication or one or more hard bits for the communication based at least in part on whether the decoding attempt was successful.

9. A wireless communication device for wireless communication, comprising:
a memory; and
one or more processors, coupled to the memory, configured to:
identify, for removal from a hybrid automatic repeat request (HARQ) buffer of the wireless communication device, a HARQ process from a plurality of HARQ processes maintained in the HARQ buffer by the wireless communication device,
wherein the HARQ process is identified for removal based at least in part on a plurality of HARQ buffer management parameters; and
remove the HARQ process from the HARQ buffer,
wherein the one or more processors, to remove the HARQ process, are configured to:
remove one or more soft bits of the HARQ process from the HARQ buffer and maintain one or more hard bits in the HARQ buffer.

10. The wireless communication device of claim 9,
wherein the one or more processors are further configured to:
determine to add another HARQ process to the HARQ buffer; and
determine that a quantity of HARQ processes, including the plurality of HARQ processes and the other HARQ process, does not satisfy a quantity threshold for the HARQ buffer; and
wherein the one or more processors, to identify the HARQ process from the plurality of HARQ processes, are configured to:
identify the HARQ process based at least in part on determining that the quantity of HARQ processes does not satisfy the quantity threshold for the HARQ buffer.

11. The wireless communication device of claim 9,
wherein the one or more HARQ buffer management parameters comprise a HARQ process age parameter; and
wherein the one or more processors, to identify the HARQ process from the plurality of HARQ processes, are configured to:
identify, based at least in part on the HARQ process age parameter, the HARQ process based at least in part on the HARQ process being a least recently used HARQ process of the plurality of HARQ processes.

12. The wireless communication device of claim 9,
wherein the one or more HARQ buffer management parameters comprise a HARQ retransmission parameter; and
wherein the one or more processors, to identify the HARQ process from the plurality of HARQ processes, are configured to:
identify, based at least in part on the HARQ retransmission parameter, the HARQ process based at least in part on a quantity of retransmissions for the HARQ process being a greatest quantity of retransmissions among the plurality of HARQ processes.

13. The wireless communication device of claim 9,
wherein the plurality of HARQ buffer management parameters comprise a carrier type parameter; and
wherein the one or more processors, to identify the HARQ process from the plurality of HARQ processes, are configured to:
identify, based at least in part on the carrier type parameter, the HARQ process based at least in part on the HARQ process being associated with a secondary carrier of the wireless communication device.

14. The wireless communication device of claim 9,
wherein the one or more HARQ buffer management parameters comprise a decoding parameter; and
wherein the one or more processors, to identify the HARQ process from the plurality of HARQ processes, are configured to:
identify, based at least in part on the decoding parameter, the HARQ process based at least in part on a decoding success rate for the HARQ process being a lowest decoding success rate among the plurality of HARQ processes.

15. The wireless communication device of claim 9,
wherein the plurality of HARQ buffer management parameters comprise:
a periodic HARQ process timer; and
a maximum HARQ process timer; and
wherein the one or more processors, to identify the HARQ process from the plurality of HARQ processes, are configured to:
identify the HARQ process based at least in part on determining that at least one of the periodic HARQ process timer has expired or the maximum HARQ process timer has expired.

16. The wireless communication device of claim 9, wherein the HARQ buffer comprises a shared HARQ buffer that is sized for storing soft bits or hard bits; and wherein the one or more processors are further configured to:
   determine, for another HARQ process of the plurality of HARQ processes, whether a decoding attempt for a communication associated with the other HARQ process was successful; and
   selectively store, in the shared HARQ buffer, one or more soft bits for the communication or one or more hard bits for the communication based at least in part on whether the decoding attempt was successful.

17. A non-transitory computer-readable medium storing a set of instructions for wireless communication, the set of instructions comprising:
   one or more instructions that, when executed by one or more processors of a wireless communication device, cause the wireless communication device to:
      identify, for removal from a hybrid automatic repeat request (HARQ) buffer of the wireless communication device, a HARQ process from a plurality of HARQ processes maintained in the HARQ buffer by the wireless communication device,
         wherein the HARQ process is identified for removal based at least in part on a plurality of HARQ buffer management parameters; and
      remove the HARQ process from the HARQ buffer, wherein the one or more instructions, that cause the wireless communication device to remove the HARQ process, cause the wireless communication device to:
         remove one or more soft bits of the HARQ process from the HARQ buffer and maintain one or more hard bits in the HARQ buffer.

18. The non-transitory computer-readable medium of claim 17, wherein the one or more instructions further cause the wireless communication device to:
   determine to add another HARQ process to the HARQ buffer; and
   determine that a quantity of HARQ processes, including the plurality of HARQ processes and the other HARQ process, does not satisfy a quantity threshold for the HARQ buffer; and
   wherein the one or more instructions, that cause the wireless communication device to identify the HARQ process from the plurality of HARQ processes, cause the wireless communication device to:
      identify the HARQ process based at least in part on determining that the quantity of HARQ processes does not satisfy the quantity threshold for the HARQ buffer.

19. The non-transitory computer-readable medium of claim 17, wherein the plurality of HARQ buffer management parameters comprise a HARQ process age parameter; and
   wherein the one or more instructions, that cause the wireless communication device to identify the HARQ process from the plurality of HARQ processes, cause the wireless communication device to:
      identify, based at least in part on the HARQ process age parameter, the HARQ process based at least in part on the HARQ process being a least recently used HARQ process of the plurality of HARQ processes.

20. The non-transitory computer-readable medium of claim 17, wherein the plurality of HARQ buffer management parameters comprise a HARQ retransmission parameter; and
   wherein the one or more instructions, that cause the wireless communication device to identify the HARQ process from the plurality of HARQ processes, cause the wireless communication device to:
      identify, based at least in part on the HARQ retransmission parameter, the HARQ process based at least in part on a quantity of retransmissions for the HARQ process being a greatest quantity of retransmissions among the plurality of HARQ processes.

21. The non-transitory computer-readable medium of claim 17, wherein the plurality of HARQ buffer management parameters comprise a carrier type parameter; and
   wherein the one or more instructions, that cause the wireless communication device to identify the HARQ process from the plurality of HARQ processes, cause the wireless communication device to:
      identify, based at least in part on the carrier type parameter, the HARQ process based at least in part on the HARQ process being associated with a secondary carrier of the wireless communication device.

22. The non-transitory computer-readable medium of claim 17, wherein the plurality of HARQ buffer management parameters comprise a decoding parameter; and
   wherein the one or more instructions, that cause the wireless communication device to identify the HARQ process from the plurality of HARQ processes, cause the wireless communication device to:
      identify, based at least in part on the decoding parameter, the HARQ process based at least in part on a decoding success rate for the HARQ process being a lowest decoding success rate among the plurality of HARQ processes.

23. The non-transitory computer-readable medium of claim 17, wherein the plurality of HARQ buffer management parameters comprise:
   a periodic HARQ process timer; and
   a maximum HARQ process timer; and
   wherein the one or more instructions, that cause the wireless communication device to identify the HARQ process from the plurality of HARQ processes, cause the wireless communication device to:
      identify the HARQ process based at least in part on determining that at least one of the periodic HARQ process timer has expired or the maximum HARQ process timer has expired.

24. The non-transitory computer-readable medium of claim 17, wherein the HARQ buffer comprises a shared HARQ buffer that is sized for storing soft bits or hard bits; and
   wherein the one or more instructions further cause the wireless communication device to:
      determine, for another HARQ process of the plurality of HARQ processes, whether a decoding attempt for a communication associated with the other HARQ process was successful; and selectively store, in the shared HARQ buffer, one or more soft bits for the communication or one or more hard bits for the communication based at least in part on whether the decoding attempt was successful.

25. An apparatus for wireless communication, comprising:

means for identifying, for removal from a hybrid automatic repeat request (HARQ) buffer of the apparatus, a HARQ process from a plurality of HARQ processes maintained in the HARQ buffer by the apparatus, wherein the HARQ process is identified for removal based at least in part on a plurality of HARQ buffer management parameters; and means for removing the HARQ process from the HARQ buffer, wherein the means for removing the HARQ process comprise means for removing one or more soft bits of the HARQ process from the HARQ buffer and means for maintaining one or more hard bits in the HARQ buffer.

26. The apparatus of claim 25, further comprising:

means for determining to add another HARQ process to the HARQ buffer; and means for determining that a quantity of HARQ processes, including the plurality of HARQ processes and the other HARQ process, does not satisfy a quantity threshold for the HARQ buffer; and wherein the means for identifying the HARQ process from the plurality of HARQ processes comprises:

means for identifying the HARQ process based at least in part on determining that the quantity of HARQ processes does not satisfy the quantity threshold for the HARQ buffer.

27. The apparatus of claim 25, wherein the plurality of HARQ buffer management parameters comprise a HARQ process age parameter; and wherein the means for identifying the HARQ process from the plurality of HARQ processes comprises:

means for identifying, based at least in part on the HARQ process age parameter, the HARQ process based at least in part on the HARQ process being a least recently used HARQ process of the plurality of HARQ processes.

28. The apparatus of claim 25, wherein the plurality of HARQ buffer management parameters comprise a HARQ retransmission parameter; and wherein the means for identifying the HARQ process from the plurality of HARQ processes comprises:

means for identifying, based at least in part on the HARQ retransmission parameter, the HARQ process based at least in part on a quantity of retransmissions for the HARQ process being a greatest quantity of retransmissions among the plurality of HARQ processes.

29. The apparatus of claim 25, wherein the plurality of HARQ buffer management parameters comprise a carrier type parameter; and wherein the means for identifying the HARQ process from the plurality of HARQ processes comprises:

means for identifying, based at least in part on the carrier type parameter, the HARQ process based at least in part on the HARQ process being associated with a secondary carrier of the apparatus.

30. The apparatus of claim 25, wherein the plurality of HARQ buffer management parameters comprise a decoding parameter; and wherein the means for identifying the HARQ process from the plurality of HARQ processes comprises:

means for identifying, based at least in part on the decoding parameter, the HARQ process based at least in part on a decoding success rate for the HARQ process being a lowest decoding success rate among the plurality of HARQ processes.

* * * * *